US008795048B2

(12) United States Patent
Schaefer et al.

(10) Patent No.: US 8,795,048 B2
(45) Date of Patent: Aug. 5, 2014

(54) GAMING SYSTEM, GAMING DEVICE, AND METHOD PROVIDING A MULTI-STAGE DICE BONUS GAME

(75) Inventors: Craig M. Schaefer, Las Vegas, NV (US); Vincent P. Smith, Las Vegas, NV (US); Brian A. Johnson, Las Vegas, NV (US); Mathew T. Planet, Las Vegas, NV (US)

(73) Assignee: IGT, Las Vegas, NV (US)

( * ) Notice: Subject to any disclaimer, the term of this patent is extended or adjusted under 35 U.S.C. 154(b) by 148 days.

(21) Appl. No.: 13/312,633

(22) Filed: Dec. 6, 2011

(65) Prior Publication Data

US 2013/0143645 A1 Jun. 6, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .............................................. 463/10; 463/25

(58) Field of Classification Search
USPC ..................................................... 463/10, 25
See application file for complete search history.

(56) References Cited

U.S. PATENT DOCUMENTS

| | | | |
|---|---|---|---|
| 4,582,324 | A | 4/1986 | Koza et al. |
| 4,624,459 | A | 11/1986 | Kaufman |
| 4,695,053 | A | 9/1987 | Vazquez, Jr. et al. |
| 4,732,386 | A | 3/1988 | Rayfiel |
| 4,738,451 | A | 4/1988 | Logg |
| 4,756,531 | A | 7/1988 | DiRe |
| 5,269,687 | A | 12/1993 | Mott et al. |
| 5,342,047 | A | 8/1994 | Heidel et al. |
| 5,407,200 | A | 4/1995 | Zalabah |
| 5,449,173 | A | 9/1995 | Thomas et al. |
| 5,498,003 | A | 3/1996 | Gechter |
| 5,501,455 | A | 3/1996 | Hirata et al. |
| 5,632,485 | A | 5/1997 | Woodland et al. |

(Continued)

FOREIGN PATENT DOCUMENTS

| | | |
|---|---|---|
| CA | 2 270 062 | 10/1999 |
| EP | 0 945 837 | 9/1999 |

(Continued)

OTHER PUBLICATIONS

"Dice Games," Hoyle's Rules of Games, Albert H. Morehead and Geoffrey Mott-Smith, pp. 236-243, 2d Revised Edition, 1983 (4 pages).

*Primary Examiner* — William M. Brewster
(74) *Attorney, Agent, or Firm* — Neal, Gerber & Eisenberg LLP

(57) ABSTRACT

The present disclosure provides gaming systems, devices, and methods providing a multi-stage bonus game. When a first stage triggering event occurs, the gaming system initiates a first bonus game stage. During the first stage, the gaming system enables the player to roll dice, and determine any first stage awards based on the outcome or outcomes of the rolls. When a second stage triggering event occurs, the gaming system initiates a second bonus game stage. During the second stage, the gaming system enables the player to roll dice, and may provide the player with elements, which the player accumulates during the second stage, based on the outcome or outcomes of the rolls. When a second stage termination event occurs, the gaming system determines any second stage awards based on a total quantity of elements accumulated by the player, provides the player with any determined awards, and terminates the bonus game.

24 Claims, 17 Drawing Sheets

(56) References Cited

U.S. PATENT DOCUMENTS

| | | | |
|---|---|---|---|
| 5,722,891 | A | 3/1998 | Inoue |
| 5,730,654 | A | 3/1998 | Brown |
| 5,772,509 | A | 6/1998 | Weiss |
| 5,788,573 | A | 8/1998 | Baerlocher et al. |
| 5,823,874 | A | 10/1998 | Adams |
| 5,848,932 | A | 12/1998 | Adams |
| 5,873,781 | A | 2/1999 | Keane |
| 5,882,261 | A | 3/1999 | Adams |
| 5,885,157 | A | 3/1999 | Harada et al. |
| 5,911,418 | A | 6/1999 | Adams |
| 5,919,088 | A | 7/1999 | Weiss |
| 5,928,081 | A | 7/1999 | Bochichio et al. |
| 5,947,820 | A | 9/1999 | Morro et al. |
| 5,980,384 | A | 11/1999 | Barrie |
| 5,997,401 | A | 12/1999 | Crawford |
| 6,004,207 | A | 12/1999 | Wilson, Jr. et al. |
| 6,015,346 | A | 1/2000 | Bennett |
| 6,033,307 | A | 3/2000 | Vancura |
| 6,059,289 | A | 5/2000 | Vancura |
| 6,062,980 | A | 5/2000 | Luciano |
| 6,089,976 | A | 7/2000 | Schneider et al. |
| 6,089,978 | A | 7/2000 | Adams |
| 6,093,102 | A | 7/2000 | Bennett |
| 6,102,403 | A | 8/2000 | Kaufman |
| 6,102,798 | A | 8/2000 | Bennett |
| 6,113,098 | A | 9/2000 | Adams |
| 6,113,102 | A | 9/2000 | Marks et al. |
| 6,120,031 | A | 9/2000 | Adams |
| 6,126,542 | A | 10/2000 | Fier |
| 6,126,544 | A | 10/2000 | Kojima |
| 6,135,884 | A | 10/2000 | Hedrick et al. |
| 6,142,873 | A | 11/2000 | Weiss et al. |
| 6,146,273 | A | 11/2000 | Olsen |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,173,955 | B1 | 1/2001 | Perrie et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,224,483 | B1 | 5/2001 | Mayeroff |
| 6,227,969 | B1 | 5/2001 | Yoseloff |
| 6,227,971 | B1 | 5/2001 | Weiss |
| 6,227,972 | B1 | 5/2001 | Walker et al. |
| 6,231,442 | B1 | 5/2001 | Mayeroff |
| 6,234,897 | B1 | 5/2001 | Frohm et al. |
| 6,261,177 | B1 | 7/2001 | Bennett |
| 6,283,855 | B1 | 9/2001 | Bingham |
| 6,286,834 | B1 | 9/2001 | Caputo |
| 6,302,790 | B1 | 10/2001 | Brossard |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,664 | B1 | 11/2001 | Baerlocher et al. |
| 6,328,649 | B1 | 12/2001 | Randall et al. |
| 6,334,814 | B1 | 1/2002 | Adams |
| 6,338,678 | B1 | 1/2002 | Seelig et al. |
| 6,343,988 | B1 | 2/2002 | Walker et al. |
| 6,347,795 | B1 | 2/2002 | DeLeljer |
| 6,347,996 | B1 | 2/2002 | Gilmore et al. |
| 6,364,766 | B1 | 4/2002 | Anderson et al. |
| 6,375,187 | B1 | 4/2002 | Baerlocher |
| 6,375,567 | B1 | 4/2002 | Acres |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,413,160 | B1 | 7/2002 | Vancura |
| 6,428,412 | B1 | 8/2002 | Anderson et al. |
| 6,439,995 | B1 | 8/2002 | Hughs-Baird et al. |
| 6,443,837 | B1 | 9/2002 | Jaffe et al. |
| 6,450,884 | B1 | 9/2002 | Seelig et al. |
| 6,454,651 | B1 | 9/2002 | Yoseloff |
| 6,481,713 | B2 | 11/2002 | Perrie et al. |
| 6,482,089 | B2 | 11/2002 | DeMar et al. |
| 6,491,584 | B2 | 12/2002 | Graham et al. |
| 6,494,454 | B2 | 12/2002 | Adams |
| 6,506,117 | B2 | 1/2003 | DeMar et al. |
| 6,508,707 | B2 | 1/2003 | DeMar et al. |
| 6,565,088 | B2 | 5/2003 | Perrie et al. |
| 6,565,436 | B1 | 5/2003 | Baerlocher |
| 6,585,588 | B2 | 7/2003 | Hartl |
| 6,634,943 | B1 | 10/2003 | Baerlocher |
| 6,656,047 | B1 | 12/2003 | Tarantino et al. |
| 6,682,419 | B2 | 1/2004 | Webb et al. |
| 6,682,420 | B2 | 1/2004 | Webb et al. |
| 6,702,671 | B2 | 3/2004 | Tarantino |
| 6,726,563 | B1 | 4/2004 | Baerlocher et al. |
| 6,733,389 | B2 | 5/2004 | Webb et al. |
| 6,786,819 | B2 | 9/2004 | Baerlocher et al. |
| 6,852,028 | B2 | 2/2005 | Vancura |
| 6,981,917 | B2 | 1/2006 | Webb et al. |
| 7,004,836 | B2 | 2/2006 | Kaminkow et al. |
| 7,090,579 | B2 | 8/2006 | Tarantino |
| 7,131,908 | B2 | 11/2006 | Baerlocher |
| 7,153,205 | B2 | 12/2006 | Baerlocher |
| 7,153,207 | B2 | 12/2006 | Kaminkow et al. |
| 7,153,208 | B2 | 12/2006 | Kaminkow et al. |
| 7,156,737 | B2 | 1/2007 | Kaminkow et al. |
| 7,169,046 | B2 | 1/2007 | Webb et al. |
| 7,204,754 | B2 | 4/2007 | Gray et al. |
| 7,210,997 | B2 | 5/2007 | Hughs-Baird et al. |
| 7,223,172 | B2 | 5/2007 | Baerlocher et al. |
| 7,278,919 | B2 | 10/2007 | Souza et al. |
| 7,399,228 | B2 | 7/2008 | Baerlocher |
| 7,513,827 | B2 | 4/2009 | Baerlocher |
| 7,556,267 | B2 | 7/2009 | Vancura et al. |
| 7,597,618 | B2 | 10/2009 | Webb et al. |
| 7,614,947 | B2 | 11/2009 | Baerlocher et al. |
| 7,614,953 | B2 | 11/2009 | Souza et al. |
| 7,624,986 | B2 | 12/2009 | Nicely |
| 7,775,877 | B2 | 8/2010 | Baerlocher et al. |
| 7,785,196 | B2 | 8/2010 | Baerlocher et al. |
| 7,824,262 | B2 | 11/2010 | Webb et al. |
| 7,874,913 | B2 | 1/2011 | Webb et al. |
| 2002/0135129 | A1 | 9/2002 | Tarantino |
| 2002/0160827 | A1 | 10/2002 | Slomiany et al. |
| 2003/0104852 | A1 | 6/2003 | Duhamel |
| 2004/0043815 | A1 | 3/2004 | Kaminkow |
| 2005/0032565 | A1 | 2/2005 | Cheng et al. |
| 2010/0285864 | A1 | 11/2010 | Baerlocher et al. |
| 2011/0300919 | A1 * | 12/2011 | Miyawaki et al. .............. 463/20 |
| 2012/0064961 | A1 * | 3/2012 | Vancura .......................... 463/20 |

FOREIGN PATENT DOCUMENTS

| | | |
|---|---|---|
| GB | 2 100 905 | 6/1981 |
| GB | 2 106 293 | 9/1981 |
| GB | 2 090 690 | 7/1982 |
| GB | 2 096 376 | 10/1982 |
| GB | 2 137 392 | 10/1984 |
| GB | 2 144 644 | 3/1985 |
| GB | 2 153 572 | 8/1985 |
| GB | 2 170 636 | 8/1986 |
| GB | 2 180 682 | 4/1987 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 242 300 | 9/1991 |

* cited by examiner

GAMING SYSTEM, GAMING DEVICE, AND METHOD PROVIDING A MULTI-STAGE DICE BONUS GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on the amount of the wager (e.g., the higher the wager, the higher the award). Winning symbols or winning symbol combinations that are less likely to occur usually provide higher awards.

For such known gaming machines, the amount of the wager placed on the primary game by the player may vary. For instance, the gaming machine may enable the player to wager a minimum number of credits, such as one credit (e.g., one cent, nickel, dime, quarter, or dollar) up to a maximum quantity of credits, such as five credits. This wager may be placed by the player a single time or multiple times in a single play of the primary game. For instance, gaming machine configured to operate a slot game may have one or more paylines, and the gaming machine may enable a player to place a wager on each payline for a single play of the slot game. Thus, it is known that a gaming machine, such as one configured to operate a slot game, may enable players to place wagers of substantially different amounts on each play of the primary game ranging, for example, from one credit up to 125 credits (e.g., five credits on each of twenty-five separate paylines). This is also true for other wagering games, such as video draw poker, where players can place wagers of one or more credits on each hand, and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an award to a player in addition to any awards provided for any plays of one or more primary games. Secondary or bonus games usually do not require an additional wager by the player to be activated. Secondary or bonus games are generally activated or triggered upon an occurrence of a designated triggering symbol or triggering symbol combination in the primary game. For instance, a bonus symbol occurring on the payline on the third reel of a three reel slot machine may trigger the secondary or bonus game. When a secondary or bonus game is triggered, the gaming machine generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Another part of the enjoyment and excitement of playing certain gaming machines is playing the secondary or bonus game. Many known secondary or bonus games, such as those offering free spins of slot machine reels or a free spin of an award wheel, include a limited amount of player interaction. Due to the limited amount of player interaction, a player may perceive these secondary or bonus games as being completely out of the player's control, meaning that the player is relying on pure luck to win a secondary or bonus award. Certain players do not enjoy playing these types of secondary or bonus games, and would rather play secondary or bonus games that include one or more player-controllable elements (or perceived player-controllable elements). Because they are directly controlling (or appear to be directly controlling) certain aspects of these types of secondary or bonus games, the players feel personally invested in, and enjoy playing, these secondary or bonus games. Accordingly, there is a continuing need to provide new secondary or bonus games that include a large amount of player interaction and involvement.

SUMMARY

Various embodiments of the present disclosure provide a gaming system, gaming device, and method providing a multi-stage dice bonus game. The gaming system is configured to operate one or more primary games upon one or more wagers by a player. Upon the occurrence of a first stage triggering event during play of or in association with the primary game, the gaming system initiates the bonus game and, more particularly, initiates a first stage of the bonus game. During play of the first stage, the gaming system enables the player to roll one or more dice one or more times. Each roll results in one of a plurality of different potential first stage outcomes. The gaming system determines one or more first stage awards (if any) based on the determined first stage outcome or outcomes for the roll or rolls of the dice in the first stage. Upon the occurrence of a second stage triggering event during play of or in association with the first stage, the gaming system ends or terminates the first stage and initiates a second stage of the bonus game.

During play of the second stage, the gaming system enables the player to roll one or more dice one or more times. Each roll results in one of a plurality of different potential second stage outcomes. The gaming system may provide the player with one or more elements, which the player collects or accumulates during play of or in association with the second stage, based on the second stage outcome or outcomes for the roll or rolls of the dice in the second stage. Upon the occurrence of a second stage termination event during play of or in association with the second stage, the gaming system: (a) determines any second stage awards based on a total quantity of elements accumulated by the player during play of the second stage; (b) provides the player with any determined first stage awards and any determined second stage awards; and (c) ends or terminates the second stage, thereby ending or terminating the bonus game.

In various embodiments, a first quantity of the potential first stage outcomes are each associated with a first stage award, and a second quantity of the potential first stage outcomes are each associated with the second stage triggering event. Specifically, for each of the second quantity of the potential first stage outcomes, when that first stage outcome is determined and displayed as an outcome of a roll during play of the first stage, the gaming system ends or terminates the first stage and initiates the second stage.

In these embodiments, upon initiation of the first stage, the gaming system enables a player to roll the dice. For that roll, the gaming system determines one of the potential first stage outcomes and displays the determined first stage outcome. If the determined first stage outcome is one of the first quantity of the potential first stage outcomes, the gaming system adds the first stage award associated with the determined first stage outcome to a total first stage award and enables the player to roll the dice again. If the determined first stage outcome is one of the second quantity of the potential first stage outcomes, the gaming system ends or terminates play of the first stage and initiates play of the second stage.

In various embodiments, a first quantity of the potential second stage outcomes are each associated with an award of one or more elements, and a second quantity of the potential second stage outcomes are associated with the second stage termination event. Specifically, for each of the second quantity of the potential second stage outcomes, when that second stage outcome is determined and displayed as an outcome of a roll during play of the second stage, the gaming system ends or terminates the second stage, thereby ending or terminating the bonus game.

In these embodiments, upon initiation of the second stage, the gaming system enables a player to roll the dice. For that roll, the gaming system determines one of the potential second stage outcomes and displays the determined second stage outcome. If the determined second stage outcome is one of the first quantity of the potential second stage outcomes, the gaming system provides the player with a quantity of elements and enables the player to roll the dice again. If the determined second stage outcome is one of the second quantity of the potential second stage outcomes, the gaming system: (a) determines any second stage awards based on a total quantity of elements accumulated by the player during the second stage; (b) provides any determined first stage awards and any determined second stage awards to the player; and (c) ends or terminates play of the second stage, thereby ending or terminating play of the multi-stage bonus game.

In certain embodiments, the gaming system includes an alternative second stage triggering event that, when it occurs, causes the gaming system to end or terminate the first stage and initiate the second stage. The alternative second stage triggering event occurs when a player rolls the dice a maximum quantity of times during play of the first stage. In certain embodiments, the gaming system includes the alternative second stage triggering event in addition to the second stage triggering event, while in other embodiments, the gaming system includes the alternative second stage triggering event instead of the second stage triggering event.

In certain embodiments, the gaming system includes an alternative second stage termination event in addition to the second stage termination event that, when it occurs, causes the gaming system to end or terminate the second stage (and, necessarily, end or terminate the bonus game). The alternative second stage termination event occurs when the player accumulates or collects a maximum quantity of elements during play of the second stage.

In various embodiments, the gaming system determines one of the potential second stage outcomes to be a threshold second stage outcome. In certain of these embodiments, the first quantity of the potential second stage outcomes includes each of the potential second stage outcomes greater than the threshold second stage outcome, and the second quantity of the potential second stage outcomes includes each of the potential second stage outcomes less than the threshold second stage outcome. In these embodiments, during play of the second stage, if the determined second stage outcome resulting from a roll of the dice is the threshold second stage outcome, the gaming system enables the player to roll the dice again.

The threshold second stage outcome is determined in one of a variety of manners. In certain embodiments, when the second stage triggering event occurs, the gaming system sets the threshold second stage outcome as the determined first stage outcome that triggered the initiation of the second stage. That is, in these embodiments, if the second stage is triggered by the determination and display of one of the second quantity of the potential first stage outcomes during play of the first stage, that determined first stage outcome is set as the threshold second stage outcome. In other embodiments that include the alternative second stage triggering event, when the alternative second stage triggering event occurs, the gaming system randomly determines the threshold second stage outcome from the potential second stage outcomes.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the base or primary game of the present disclosure are communicated from the central server to the gaming device in a thick client configuration and computerized instructions for controlling any secondary or bonus games or functions are executed by a central server in a thin client configuration.

Figure 1A:
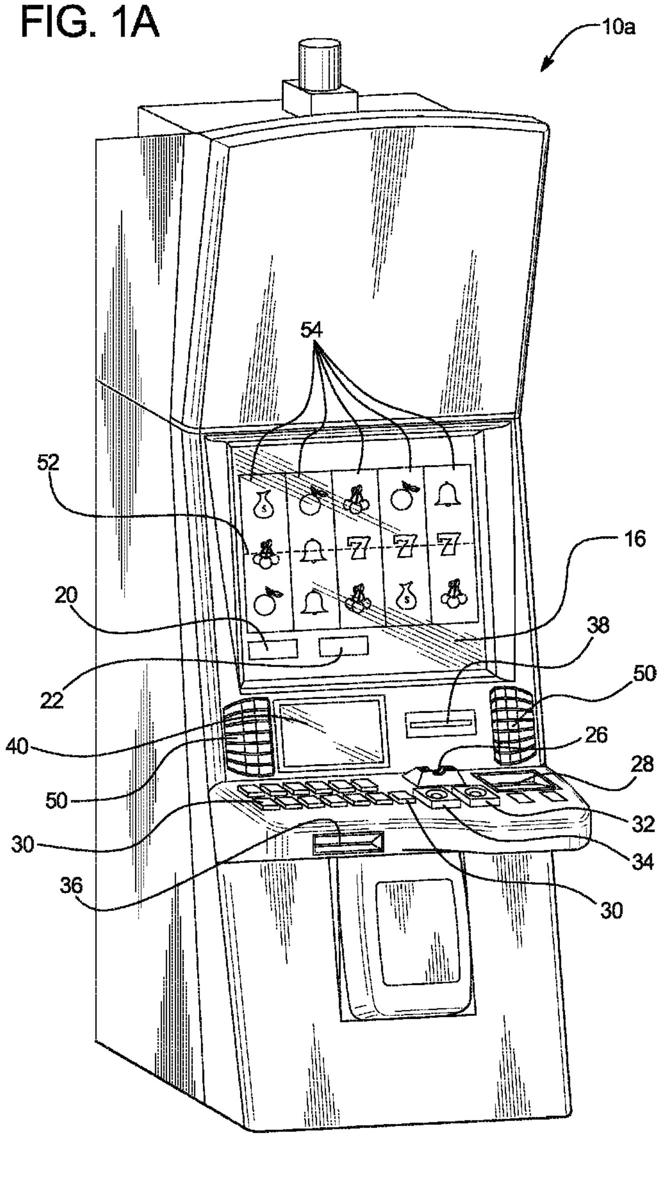
FIGS. 1A and 1B are perspective views of example alternative embodiments of a gaming device of the gaming system of the present disclosure.
Figure 1B:
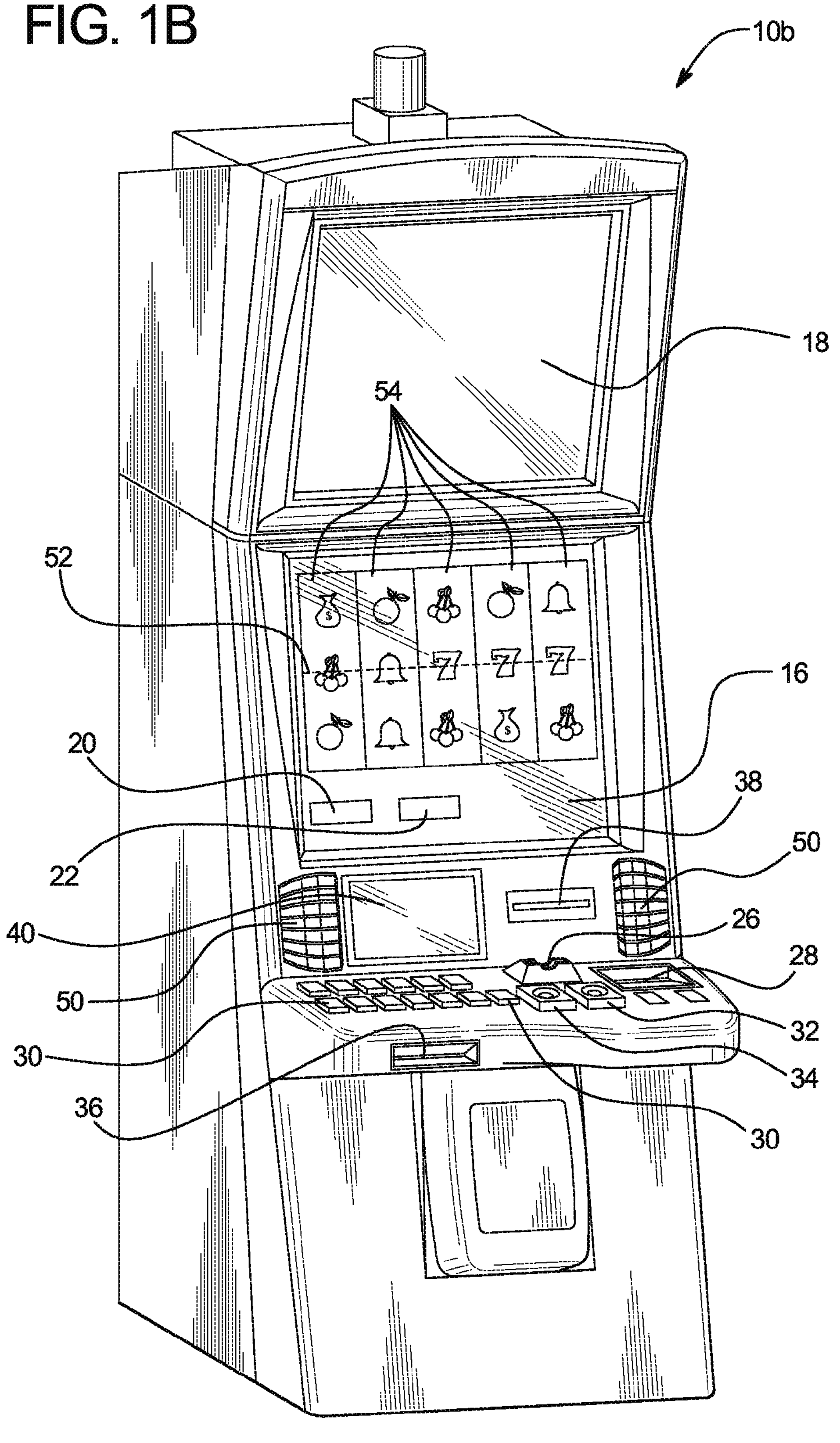

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
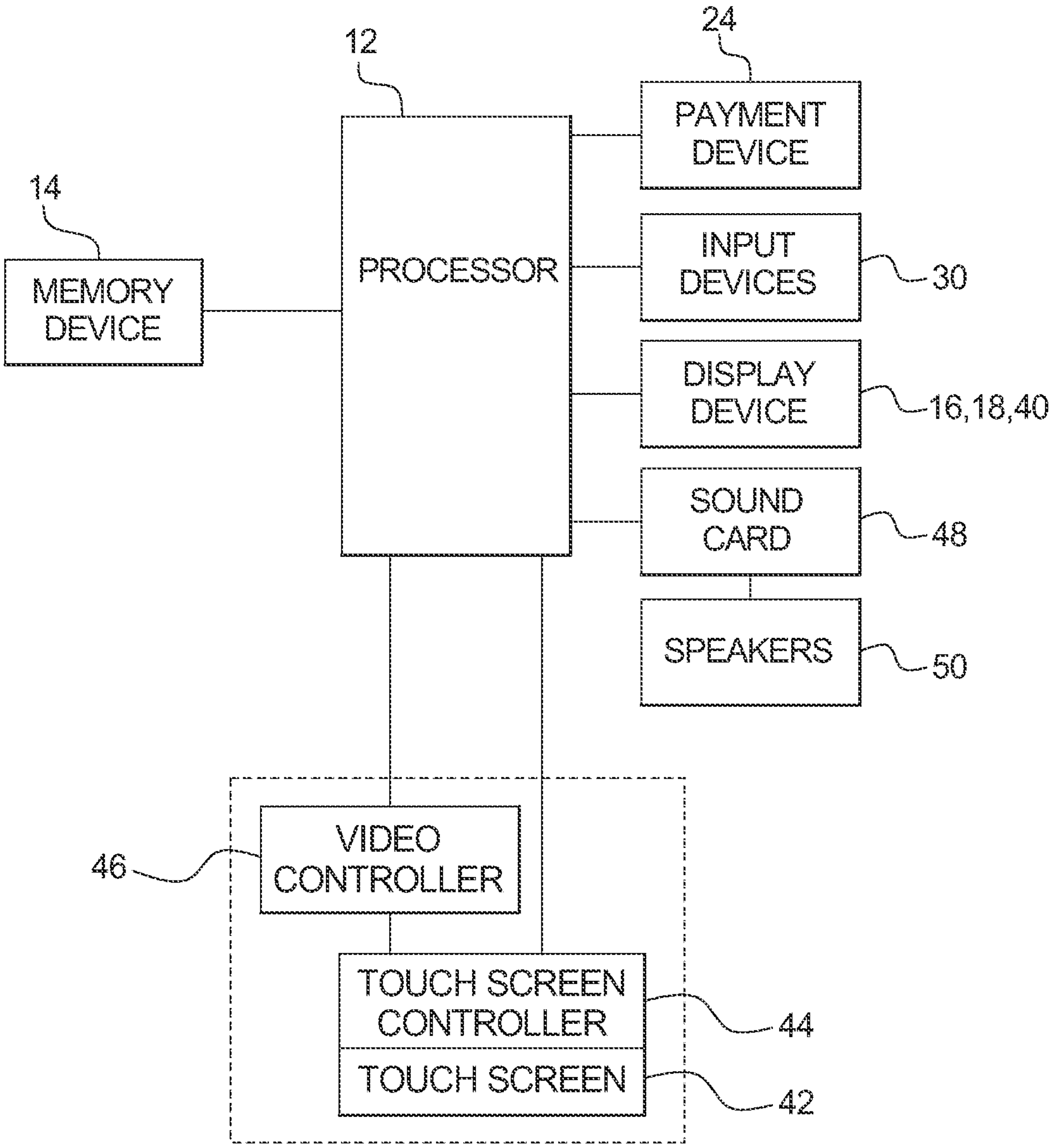
FIG. 2A is a schematic block diagram of one embodiment of an electronic configuration for one of the gaming devices of the gaming system disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM).

In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, non-transitory computer readable medium, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays any suitable base or primary game. This display device may also display any suitable secondary or bonus game associated with the base or primary game as well as information relating to the base or primary game or the secondary or bonus game. The alternative embodiment shown in FIG. 1B includes a central display device 16 and an upper display device 18. The upper display device may display the base or primary game, any suitable secondary or bonus game associated or not associated with the base or primary game, and/or information relating to the base or primary game or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the base or primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary game and/or the secondary or bonus game as a game image, symbol, or indicia.

Gaming device 10 incorporates the base or primary game and any secondary or bonus game associated with the base or primary game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different base or primary games or secondary or bonus games, such as video poker games, video blackjack games, video keno games, and video bingo games may be implemented.

In one embodiment, the base or primary game and/or the secondary or bonus game includes one or more paylines 52 associated with a plurality of symbol display positions. The paylines may be horizontal, vertical, circular, diagonal, angled, or any combination thereof. In this embodiment, the gaming device includes at least one and preferably a plurality of reels 54, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, base or primary game or the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the base or primary game or the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the base or primary game or the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the base or primary game, the gaming device may also give players the opportunity to win credits in a secondary or bonus game or in a secondary or bonus round. The secondary or bonus game enables the player to obtain a prize or payout in addition to the prize or payout, if any, obtained from the base or primary game. In general, a secondary or bonus game produces a significantly higher level of player excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia on a display device in the base or primary game, such as a BONUS symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the base or primary game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the base or primary game.

In one embodiment, the gaming device includes a program that will automatically begin a secondary or bonus round after the player has achieved a triggering event or qualifying condition in the base or primary game. In another embodiment, after a player has qualified for a secondary or bonus game, the player may subsequently enhance the player's secondary or bonus game participation through continued play of the base or primary game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the base or primary game, thus encouraging play of the base or primary game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

Figure 2B:
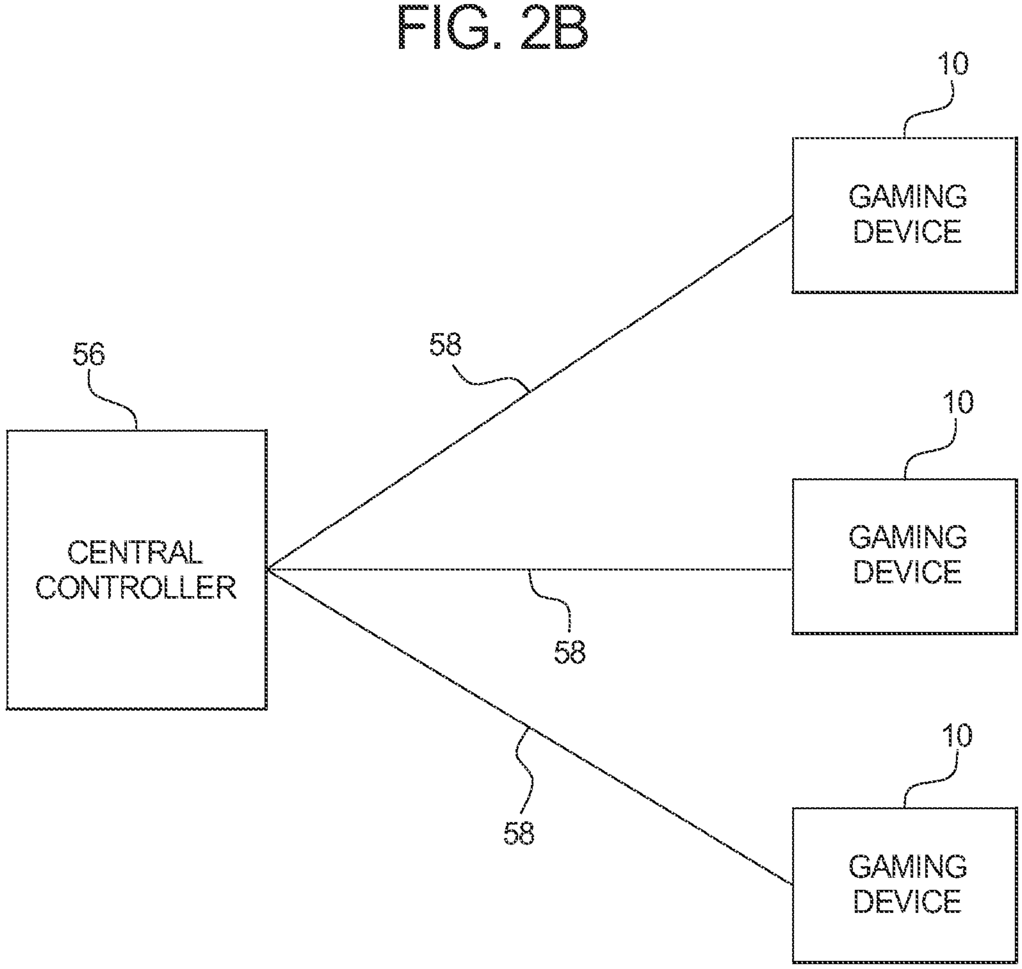
FIG. 2B is a schematic block diagram of one embodiment of a network configuration for a plurality of gaming devices of the gaming system disclosed herein.

In one embodiment, as illustrated in FIG. 2B, one or more of gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary game based on probability data. In another embodiment, the central server or controller randomly generates a game outcome for the secondary or bonus game based on probability data. In another embodiment, the central server or controller randomly generates a game outcome for both the base or primary game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary game outcome, a secondary or bonus game outcome, base or primary game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first stage, and a second gaming device to have selected elements marked in a different predetermined pattern is provided a second outcome of win $2, which will be provided to a second player regardless of how the second player plays a second stage. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the base or primary game, a secondary or bonus game, or both. In another embodiment, the game program may be executable as a secondary or bonus game to be played simultaneous with the play of the base or primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the base or primary game. That is, a player is provided a progressive award without any explanation or, alternatively, with simple explanations. In another embodiment, a player is provided a progressive award at least partially based on a game triggered or symbol triggered event, such as at least partially based on the play of the base or primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the base or primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the base or primary game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the base or primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multi-Stage Bonus Dice Game

Various embodiments of the present disclosure provide a gaming system, gaming device, and method providing a multi-stage dice bonus game (sometimes referred to herein as the "multi-stage bonus game" or the "bonus game" for brevity). In general, the gaming system is configured to operate one or more primary wagering games (sometimes referred to herein as "primary games" for brevity) upon one or more wagers by a player. The primary game or games may be any suitable primary game such as, but not limited to, video slot or spinning reel games; video poker, video blackjack, or other video card games; video bingo games; video keno games; video roulette games; or any suitable combination thereof. Upon the occurrence of a first stage triggering event during play of or in association with the primary game, the gaming system initiates the bonus game and, more particularly, initiates a first stage of the bonus game (sometimes referred to herein as the "first stage" for brevity). During play of the first stage, the gaming system enables the player to roll one or more dice one or more times (as explained in detail below). The gaming system may determine one or more first stage awards based on the outcome or outcomes of the roll or rolls of the dice in the first stage. Upon the occurrence of a second stage triggering event during play of or in association with the first stage, the gaming system ends or terminates the first stage and initiates a second stage of the bonus game (sometimes referred to herein as the "second stage" for brevity).

During play of the second stage, the gaming system enables the player to roll one or more dice one or more times (as explained in detail below). The gaming system may provide the player with one or more elements, which the player collects or accumulates during play of or in association with the second stage, based on the outcome or outcomes of the roll or rolls of the dice in the second stage. Upon the occurrence of a second stage termination event during play of or in association with the second stage, the gaming system: (a) determines any second stage awards based on a total quantity of elements accumulated by the player during play of the second stage; (b) provides the player with any determined first stage awards and any determined second stage awards; and (c) ends or terminates the second stage, thereby ending or terminating the bonus game. The first stage and the second stage are generally explained below with respect to one embodiment of the gaming system of the present disclosure.

As noted above, the gaming system enables the player to roll one or more dice one or more times during play of the first stage. Though the gaming system, in various embodiments, enables the player to roll: (a) any suitable quantity of one or more dice, (b) one or more dice including any suitable quantity of sides, and (c) one or more dice displaying any suitable numbers on the sides, it should be appreciated that, in this embodiment, the gaming system enables the player to roll two standard, six-sided dice. That is, the gaming system enables the player to roll two six-sided dice, each side of each of which displays a different one of the numbers 1, 2, 3, 4, 5, and 6. Accordingly, in this embodiment, the potential outcomes for a roll of these two dice, which are sometimes referred to herein as the potential first stage outcomes, are: 2, 3, 4, 5, 6, 7, 8, 9, 10, 11, and 12.

It should be appreciated that the quantity of dice, the quantity of sides on each of the dice, and the numbers displayed on each side of each of the dice may be determined in any suitable manner. For example, one or more of the quantity of dice, the quantity of sides on each of the dice, and the numbers displayed on each side of each of the dice may be: (a) predetermined, (b) randomly determined, (c) determined based on a weighted probability table, (d) determined based on a wager by a player, (e) determined based on game play, or (f) any suitable combination thereof.

A first quantity of the potential first stage outcomes are each associated with a first stage award, such as an award of a certain quantity of credits or any other suitable award. A second quantity of the potential first stage outcomes are each associated with the second stage triggering event. Specifically, for each of the second quantity of the potential first stage outcomes, when that first stage outcome is determined and displayed as an outcome of a roll during play of the first stage, the gaming system ends or terminates the first stage and initiates the second stage. Put differently, in this embodiment, the second stage triggering event occurs when the gaming system determines and displays one of the second quantity of the potential first stage outcomes as an outcome of a roll of the dice during play of the first stage. It should be appreciated that each of the first quantity of the potential first stage outcomes are different from one another, each of the second quantity of the potential first stage outcomes are different from one another, and each of the first quantity of the potential first stage outcomes are different from each of the second quantity of the potential first stage outcomes.

In various embodiments, the first quantity of the potential first stage outcomes includes: (a) none of the potential first stage outcomes, (b) only one of the potential first stage outcomes, and (c) a plurality of the potential first stage outcomes. Similarly, in various embodiments, the second quantity of the potential first stage outcomes includes: (a) none of the potential first stage outcomes, (b) only one of the potential first stage outcomes, and (c) a plurality of the potential first stage outcomes. In various embodiments, the potential first stage outcomes included in the first quantity of the potential first stage outcomes are: (a) predetermined, (b) randomly determined, (c) determined based on a weighted probability table, (d) determined based on a wager placed by a player, (e) determined based on game play, (f) determined in any suitable combination thereof, and (g) determined in any other suitable manner. Similarly, in various embodiments, the potential first stage outcomes included in the second quantity of the potential first stage outcomes are: (a) predetermined, (b) randomly determined, (c) determined based on a weighted probability table, (d) determined based on a wager placed by a player, (e) determined based on game play, (f) determined in any suitable combination thereof, and (g) determined in any other suitable manner.

Upon initiation of the first stage, the gaming system enables the player to roll the dice by enabling the player to input a dice roll input (or any other suitable input) to the gaming system. The player may do so by, for example, actuating a dedicated button on the gaming system, actuating a designated area on a touch screen, or indicating in any other suitable manner that the player wishes to roll the dice. After receiving the dice roll input, the gaming system determines one of the potential first stage outcomes and displays the determined first stage outcome. If the determined first stage outcome is one of the first quantity of the potential first stage outcomes, the gaming system adds the first stage award associated with the determined first stage outcome to a total first stage award, and repeats the process by enabling the player to roll the dice again. Put differently, if a first stage continuation event occurs, the gaming system adds a first stage award (if any) to the player's total first stage award, and enables the player to continue playing the first stage. If the determined first stage outcome is one of the second quantity of the potential first stage outcomes, the gaming system ends or terminates play of the first stage and initiates play of the second stage. Put differently, if the second stage triggering event occurs, the gaming system ends or terminates play of the first stage and initiates play of the second stage.

In this embodiment, the gaming system determines one of the potential first stage outcomes by using a weighted probability table that mimics a roll of the dice employed in the first stage. Table 1 below includes, for each of the potential first stage outcomes, the probability that the gaming system will select that potential first stage outcome as a result of a roll of the two standard, six-sided dice during play of the first stage. It should be appreciated that this probability table could be modified depending on the dice employed in the first stage. It should be appreciated that, in various other embodiments, the gaming system determines one of the potential first stage outcomes: (a) randomly, (b) based on a wager placed by the player, (c) based on game play, (d) any suitable combination thereof, and (e) in any other suitable manner.

TABLE 1

| | Potential First Stage Outcome | | | | | |
|---|---|---|---|---|---|---|
| | 2 | 3 | 4 | 5 | 6 | 7 |
| Probability of Being Selected | 2.78% | 5.56% | 8.33% | 11.11% | 13.89% | 16.67% |

| | Potential First Stage Outcome | | | | |
|---|---|---|---|---|---|
| | 8 | 9 | 10 | 11 | 12 |
| Probability of Being Selected | 13.89% | 11.11% | 8.33% | 5.56% | 2.78% |

It should be appreciated from the above explanation that, in this embodiment, the gaming system enables the player to roll the dice as many times as possible during play of the first stage until one of the player's rolls results in a first stage outcome that is one of the second quantity of the potential first stage outcomes. That is, the gaming system enables the player to roll the dice until the second stage triggering event occurs.

As noted above, the gaming system enables the player to roll one or more dice one or more times during play of the second stage. Though the gaming system, in various embodiments, enables the player to roll: (a) any suitable quantity of one or more dice, (b) one or more dice including any suitable quantity of sides, and (c) one or more dice displaying any suitable numbers on the sides, it should be appreciated that, in this embodiment, the gaming system enables the player to roll two standard, six-sided dice. That is, the gaming system enables the player to roll two six-sided dice, each side of each of which displays a different one of the numbers 1, 2, 3, 4, 5, and 6. Accordingly, in this embodiment, the potential outcomes for a roll of these two dice, which are sometimes referred to herein as the potential second stage outcomes, are: 2, 3, 4, 5, 6, 7, 8, 9, 10, 11, and 12. That is, in this embodiment, the potential first stage outcomes and the potential second stage outcomes are the same, as are the dice employed in both stages.

It should be appreciated that the quantity of dice, the quantity of sides on each of the dice, and the numbers displayed on each side of each of the dice may be determined in any suitable manner. For example, one or more of the quantity of dice, the quantity of sides on each of the dice, and the numbers displayed on each side of each of the dice may be: (a) predetermined, (b) randomly determined, (c) determined based on a weighted probability table, (d) determined based on a wager by a player, (e) determined based on game play, or (f) any suitable combination thereof.

A first quantity of the potential second stage outcomes are each associated with an award of one or more elements. A second quantity of the potential second stage outcomes are associated with the second stage termination event. Specifically, for each of the second quantity of the potential second stage outcomes, when that second stage outcome is determined and displayed as an outcome of a roll during play of the second stage, the gaming system ends or terminates the second stage, thereby ending or terminating the bonus game. Put differently, in this embodiment, the second stage termination event occurs when the gaming system determines and displays one of the second quantity of the potential second stage outcomes as an outcome of a roll of the dice during play of the second stage. It should be appreciated that each of the first quantity of the potential second stage outcomes are different from one another, each of the second quantity of the potential second stage outcomes are different from one another, and each of the first quantity of the potential second stage outcomes are different from each of the second quantity of the potential second stage outcomes.

In various embodiments, the first quantity of the potential second stage outcomes includes: (a) none of the potential second stage outcomes, (b) only one of the potential second stage outcomes, and (c) a plurality of the potential second stage outcomes. Similarly, in various embodiments, the second quantity of the potential second stage outcomes includes: (a) none of the potential second stage outcomes, (b) only one of the potential second stage outcomes, and (c) a plurality of the potential second stage outcomes. In various embodiments, the potential second stage outcomes included in the first quantity of the potential second stage outcomes are: (a) predetermined, (b) randomly determined, (c) determined based on a weighted probability table, (d) determined based on a wager placed by a player, (e) determined based on game play, (f) determined in any suitable combination thereof, and (g) determined in any other suitable manner. Similarly, in various embodiments, the potential second stage outcomes included in the second quantity of the potential second stage outcomes are: (a) predetermined, (b) randomly determined, (c) determined based on a weighted probability table, (d) determined based on a wager placed by a player, (e) determined based on game play, (f) determined in any suitable combination thereof, and (g) determined in any other suitable manner.

Upon initiation of the second stage, the gaming system enables the player to roll the dice by enabling the player to input a dice roll input (or any other suitable input) to the gaming system, as described above. After receiving the dice roll input, the gaming system determines one of the potential second stage outcomes and displays the determined second stage outcome. If the determined second stage outcome is one of the first quantity of the potential second stage outcomes, the gaming system provides the player with a quantity of elements and repeats the process by enabling the player to roll the dice again. Put differently, if a second stage continuation event occurs, the gaming system provides the player with the quantity of elements, and enables the player to continue playing the second stage. It should be appreciated that the quantity of elements may be any suitable quantity of elements, such as one element. If the determined second stage outcome is one of the second quantity of the potential second stage outcomes, the gaming system: (a) determines a second stage awards based on a total quantity of elements accumulated by the player during the second stage; (b) provides any determined first stage awards and any determined second stage awards to the player; and (c) ends or terminates play of the second stage, thereby ending or terminating play of the multi-stage bonus game. Put differently, if the second stage termination event occurs, the gaming system determines any second stage awards, provides any determined first stage and any determined second stage awards to the player, and ends or terminates play of the bonus game.

It should be appreciated that there are a plurality of different second stage awards available to be won. For example, in some embodiments, the second stage awards available to be won are a set of progressive awards. In other embodiments, certain of the second stage awards available to be won are predetermined credit awards, while others are progressive awards. In certain embodiments, the second stage awards available to be won are predetermined credit awards. In general, the higher the total quantity of elements a player has accumulated, the better or higher the award provided to the player.

In this embodiment, the gaming system determines one of the potential second stage outcomes by using a weighted probability table that mimics a roll of the dice employed in the second stage. Table 2 below includes, for each of the potential second stage outcomes, the probability that the gaming system will select that potential second stage outcome as a result of a roll of the two standard, six-sided dice during play of the second stage. It should be appreciated that this probability table could be modified depending on the dice employed in the second stage. It should be appreciated that, in various other embodiments, the gaming system determines one of the potential second stage outcomes: (a) randomly, (b) based on a wager placed by the player, (c) based on game play, (d) any suitable combination thereof, and (e) in any other suitable manner.

TABLE 2

| | Potential Second Stage Outcome | | | | | |
|---|---|---|---|---|---|---|
| | 2 | 3 | 4 | 5 | 6 | 7 |
| Probability of Being Selected | 2.78% | 5.56% | 8.33% | 11.11% | 13.89% | 16.67% |

| | Potential Second Stage Outcome | | | | |
|---|---|---|---|---|---|
| | 8 | 9 | 10 | 11 | 12 |
| Probability of Being Selected | 13.89% | 11.11% | 8.33% | 5.56% | 2.78% |

It should be appreciated from the above explanation that, in this embodiment, the gaming system enables the player to roll the dice as many times as possible, and accumulate as many elements as possible, during play of the second stage until one of the player's rolls results in a second stage outcome that is one of the second quantity of the potential second stage outcomes. That is, the gaming system enables the player to roll the dice during play of the second stage until the second stage termination event occurs.

In various embodiments, the gaming system includes an alternative second stage triggering event that, when it occurs, causes the gaming system to end or terminate the first stage and initiate the second stage. The alternative second stage triggering event occurs when the player rolls the dice a maximum quantity of times during play of the first stage. In some of these embodiments, the gaming system includes the alternative second stage triggering event in addition to the second stage triggering event. In these embodiments, the gaming system ends or terminates the first stage and initiates the second stage when either of the second stage triggering event or the alternative second stage triggering event occurs. It should thus be appreciated that, in these embodiments, the gaming system enables the player to roll the dice during play of the first stage until either: (a) the player rolls the dice the maximum quantity of times (i.e., until the alternative second stage triggering event occurs); or (b) a determined first stage outcome for a roll during the first stage is one of the second quantity of the potential first stage outcomes (i.e., until the second stage triggering event occurs). In other embodiments, the gaming system includes the alternative second stage triggering event instead of the second stage triggering event. It should thus be appreciated that, in these embodiments, the gaming system enables the player to roll the dice the maximum quantity of times during the first stage, and then initiates the second stage. It should be appreciated that the maximum quantity of times the player may roll the dice in the first stage (i.e., the maximum quantity of rolls in the first stage) may be any suitable number or quantity determined in any suitable manner.

In certain embodiments, the gaming system includes an alternative second stage termination event in addition to the second stage termination event that, when it occurs, causes the gaming system to end or terminate the second stage (and, necessarily, end or terminate the bonus game in these example embodiments). The alternative second stage termination event occurs when the player accumulates or collects a maximum quantity of elements during play of the second stage. Thus, in these embodiments, the gaming system does not enable the player to roll the dice a potentially (though highly unlikely) unlimited number of times (and accumulate a potentially, though unlikely, unlimited number of elements). It should thus be appreciated that, in these embodiments, the gaming system enables the player to roll the dice during play of the second stage until either: (a) the player accumulates the maximum quantity of elements (i.e., until the alternative second stage termination event occurs); or (b) a determined second stage outcome for a roll during the second stage is one of the second quantity of the potential second stage outcomes (i.e., until the second stage termination event occurs). It should be appreciated that, in certain embodiments, the alternative second stage termination event occurs when the player has rolled the dice a maximum quantity of times in the second stage.

In various embodiments, the gaming system determines one of the potential second stage outcomes to be a threshold second stage outcome. In certain of these embodiments, the first quantity of the potential second stage outcomes includes each of the potential second stage outcomes greater than the threshold second stage outcome, and the second quantity of the potential second stage outcomes includes each of the potential second stage outcomes less than the threshold second stage outcome. It should be appreciated that, in certain other embodiments, the first quantity of the potential second stage outcomes includes each of the potential second stage outcomes less than the threshold second stage outcome, and the second quantity of the potential second stage outcomes includes each of the potential second stage outcomes greater than the threshold second stage outcome.

In these embodiments, during play of the second stage, if the determined second stage outcome resulting from a roll of the dice is the threshold second stage outcome, the gaming system repeats the above-described process by enabling the player to roll the dice again. That is, if an alternative second stage continuation condition is satisfied, the gaming system enables the player continue playing the second stage. In some of these embodiments, the gaming system provides the player with a designated quantity of elements or other suitable award for rolling the threshold second stage outcome.

The threshold second stage outcome is determined in one of a variety of manners. In some embodiments, when the second stage triggering event occurs, the gaming system sets the threshold second stage outcome as the determined first stage outcome that triggered the initiation of the second stage. That is, in these embodiments, if the second stage is triggered by the determination and display of one of the second quantity of the potential first stage outcomes during play of the first stage, that determined first stage outcome is set as the threshold second stage outcome. In other embodiments that include the alternative second stage triggering event, when the alternative second stage triggering event occurs, the gaming system randomly determines the threshold second stage outcome from the potential second stage outcomes. In various other embodiments, the threshold second stage outcome is: (a) a randomly determined one of the potential second stage outcomes, (b) a randomly determined one of a subset of the potential second stage outcomes, (c) a predetermined one of the potential second stage outcomes, (d) determined based on a wager by a player, (e) determined based on game play, (f) any suitable combination thereof, or (g) determined in any suitable manner.

In certain embodiments, upon the occurrence of the second stage triggering event, the gaming system determines a consolation award, such as an award of a quantity of credits, to be provided to the player. That is, the gaming system determines the consolation award if one of the first stage outcomes determined during play of the first stage (i.e., as a result of a roll during the first stage) is one of the second quantity of the potential first stage outcomes. In various embodiments, the consolation award is: (a) predetermined, (b) randomly determined, (c) determined based on one or more weighted probability tables, (d) determined based on a wager placed by the player, (e) determined based on game play, (f) any suitable combination thereof, or (g) determined in any other suitable manner. In certain other embodiments, the gaming system determines the consolation award for the player if the player did not win a first stage award prior to the occurrence of the second stage triggering event. That is, the gaming system determines the consolation award to be provided to the player if the determined outcome of the player's first roll in the first stage is one of the second quantity of the plurality of potential first stage outcomes. In other embodiments, the gaming system does not determine or provide any consolation awards.

In other embodiments, the gaming system includes a minimum total first stage award amount that must be met before the gaming system initiates the second stage. In these embodiments, if the player triggers the second stage via the second stage triggering event (or the alternative second stage triggering event) during play of the first stage, the gaming system determines whether the sum of the amounts of any first stage awards won by the player meets the minimum total first stage award amount. If so, the gaming system ends or terminates the first stage and initiates the second stage. If not, the gaming system enables the player to roll again.

In certain embodiments, certain of the potential second stage outcomes are associated with a return to first stage triggering event. In these embodiments, when the gaming system determines one of these second stage outcomes as a result of a roll of one or more dice, the gaming system re-initiates the first stage, and enables the player to play the first stage as described above. In certain of these embodiments, the gaming system pauses or suspends the second stage when this occurs. That is, in these embodiments, when the player re-initiates the second stage during play of the re-initiated first stage, the gaming system provides the player with the second stage just as the player left it. In other embodiments, the gaming system provides the player with a new second stage.

In various embodiments, one or more anti-terminators may be provided to the player. In these embodiments, the player may utilize the anti-terminator or anti-terminators to nullify a determined first stage outcome associated with the second stage triggering event or to nullify a determined second stage outcome associated with the second stage termination event. That is, if the gaming system determines an outcome of a roll during the first stage that is one of the second quantity of the potential first stage outcomes (i.e., if the second stage triggering event occurs), the player may use one or more anti-terminators to nullify that outcome such that the first stage continues and the second stage is not initiated. Similarly, if the gaming system determines an outcome of a roll during the second stage that is one of the second quantity of the potential first stage outcomes (i.e., if the second stage termination event occurs), the player may use one or more anti-terminators to nullify that outcome such that the second stage continues and is not ended or terminated.

In one of these embodiments, the player may accumulate anti-terminators for later use to suspend a future second stage triggering event or second stage termination event. In one embodiment, the gaming system limits the player to holding a maximum quantity of anti-terminators at a time. In one embodiment, an anti-terminator may only be applied to the second stage triggering event. In another embodiment, the anti-terminator may only be applied to the second stage termination event. In certain embodiments, the second stage triggering event and the second stage termination event are each associated with their own exclusive anti-terminators. In one embodiment, a player may forfeit all, one, or a plurality of the player's anti-terminations if a certain condition is satisfied. In one embodiment, the player's anti-terminator may be automatically redeemed when the gaming system would otherwise end or terminate the first stage or the second stage. In another embodiment, the player decides if and when to redeem his or her anti-terminator. It should be appreciated that the gaming system may provide one or more anti-terminators to the player in any suitable manner, such as: (a) randomly, (b) in association with one or more determined outcomes, (c) upon initiation of the first stage and/or the second stage, or (d) when the player rolls the dice a designated quantity of times in the first stage or the second stage.

In certain embodiments, the first quantity of the potential first stage outcomes and the second quantity of the potential first stage outcomes do not change. That is, the first quantity of the potential first stage outcomes and the second quantity of the potential first stage outcomes remain the same throughout play of the first stage. In other embodiments, the first quantity of the potential first stage outcomes and the second quantity of the potential first stage outcomes change during play of the first stage. For example, in one embodiment, whenever a player rolls one of the first quantity of the potential first stage outcomes, the gaming system moves that first stage outcome from the first quantity to the second quantity. That is, in this embodiment, the chance that a player will win a first stage award decreases after every roll for which the player wins a first stage award. Similarly, in certain embodiments, the first quantity of the potential second stage outcomes and the second quantity of the potential second stage outcomes do not change. That is, the first quantity of the potential second stage outcomes and the second quantity of the potential second stage outcomes remain the same throughout play of the second stage. In other embodiments, the first quantity of the potential second stage outcomes and the second quantity of the potential second stage outcomes change during play of the first stage. For example, in one embodiment, when the player accumulates a certain quantity of elements, the gaming system moves one or more potential second stage outcomes from the first quantity to the second quantity.

In various embodiments, the bonus game is configured for persistent game play. More specifically, in these embodiments, players may play the bonus game, accumulate elements during play of the second stage, and save those elements for use in a future play of the bonus game. That is, players collect elements over a series of different gaming sessions. When the player collects a certain quantity of elements, the player may redeem those elements for an award. It should be appreciated that, since there are multiple different levels of second stage awards available to be won, each of which is associated with a different quantity of elements, in these embodiments the player may play as few or as many times as the player wishes to accumulate elements and attempt to collect enough elements to receive whatever award the player desires. It should be appreciated that the gaming system may store a record of the quantity of elements the player has collected (without redeeming) in any suitable manner, such as in a player tracking account associated with the player.

While in the above embodiments the multi-stage dice bonus game includes two stages, it should be appreciated that, in other embodiments, the bonus game includes more than two stages. For example, in one embodiment, the bonus game includes three stages. In this embodiment the first stage is played twice in a row, followed by the second stage. In the second instance of the first stage in this example, the first quantity of the potential first stage outcomes is smaller than, but associated larger awards than, the first quantity of the potential first stage outcomes in the first instance of the first stage. In other words, the two instances of the first stage are different in this example. It should be appreciated that any combination of first stages and second stages may be employed. It should also be appreciated that any suitable other types of stages may be employed, such as, but not limited to: (a) a free spin stage, (b) a wheel spin stage, and (c) a selection game stage.

While in the above examples the multi-stage dice game is described as a bonus or secondary game, it should be appreciated that, in various embodiments, the multi-stage dice game is implemented as a primary game.

Figure 3:
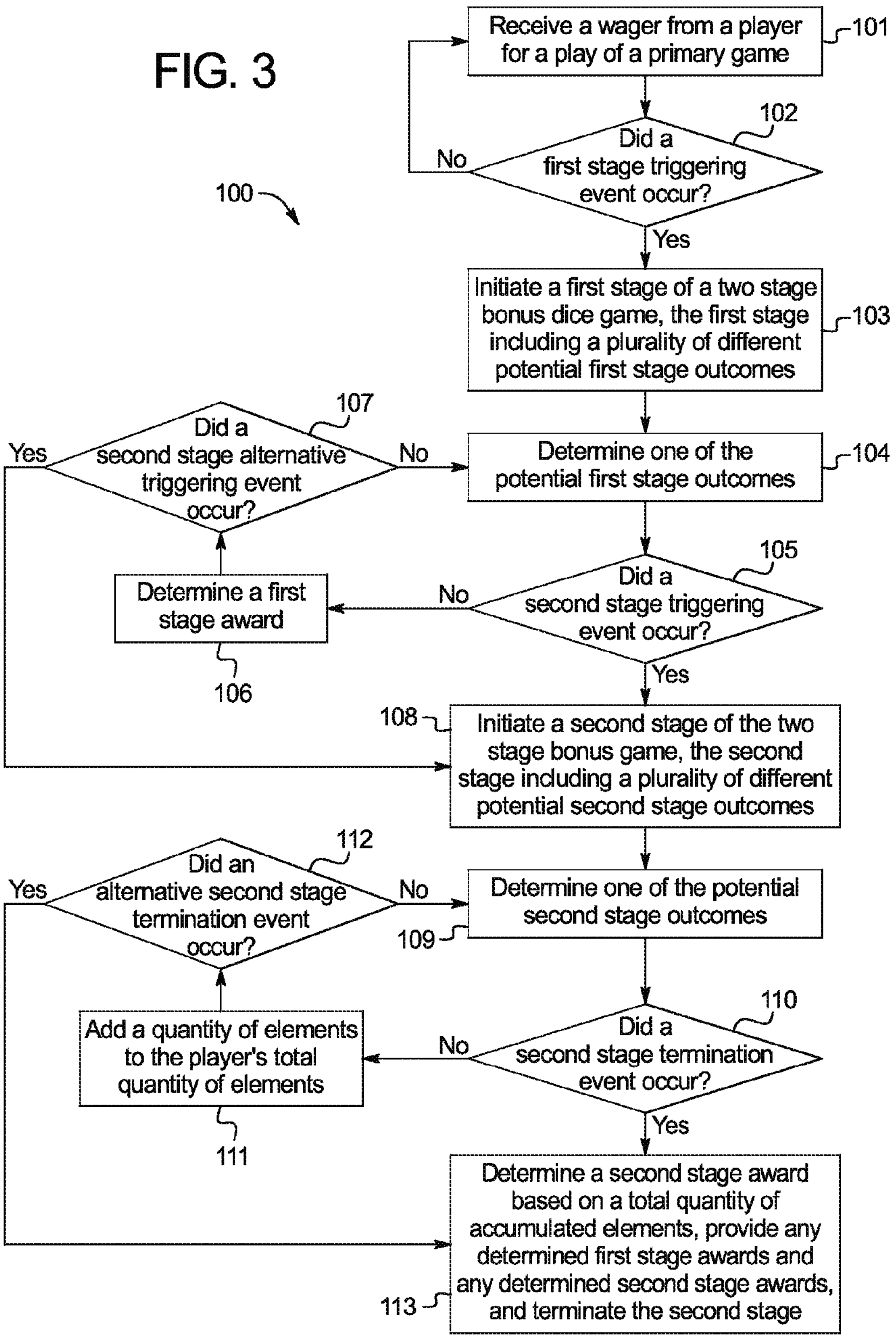
FIG. 3 is a flowchart illustrating an example method of operating a gaming system of one embodiment of the present disclosure in which the bonus game includes the alternative second stage triggering event in addition to the second stage triggering event and the alternative second stage termination event in addition to the second stage termination event.

FIG. 3 illustrates a flowchart of an example of a process or method 100 for operating a gaming system of the present disclosure that is configured to operate an embodiment of the multi-stage dice bonus game including: (a) the alternative second stage triggering event in addition to the second stage triggering event, and (b) the alternative second stage termination event in addition to the second stage termination event.

In one embodiment, this process 100 is represented by a set of instructions stored in one or more memories and executed by one or more processors or controllers. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system receives a wager from a player for a play of a primary game, as indicated by block 101. The gaming system determines whether a first stage triggering event occurred during play of or in association with the primary game, as indicated by diamond 102. If the first stage triggering event did not occur, the process returns to block 101. If the first stage triggering event did occur, the gaming system initiates a first stage of the bonus game, as indicated by block 103. In this example, the first stage includes a plurality of different potential first stage outcomes, a first quantity of which are each associated with a first stage award, and a second quantity of which are each associated with a second stage triggering event. It should be appreciated that, in this example, each of the first quantity of the potential first stage outcomes are different from one another, each of the second quantity of the potential first stage outcomes are different from one another, and each of the first quantity of the potential first stage outcomes are different from each of the second quantity of the potential first stage outcomes.

During play of the first stage bonus game, the gaming system determines one of the potential first stage outcomes, as indicated by block 104. The gaming system determines whether the second stage triggering event occurred during play of the first stage, as indicated by diamond 105. More specifically, in this example, the gaming system determines whether the determined first stage outcome is one of the first quantity or one of the second quantity of the potential first stage outcomes. If the second stage triggering event did not occur (i.e., if determined first stage outcome is one of the first quantity of the potential first stage outcomes and not one of the second quantity of the potential first stage outcomes), the gaming system determines a first stage award associated with the determined first stage outcome, as indicated by block 106. The gaming system determines whether an alternative second stage triggering event occurred, as indicated by diamond 107. More specifically, the gaming system determines whether the gaming system has determined a maximum quantity of first stage outcomes during this play of the first stage. If the alternative second stage triggering event did not occur (i.e., the gaming system has not determined the maximum quantity of first stage outcomes), the process returns to block 104. If the alternative second stage triggering event did occur (i.e., the gaming system has determined the maximum quantity of first stage outcomes), the process proceeds to block 108, explained below.

After the occurrence of either the second stage triggering event or the alternative second stage triggering event, the gaming system initiates a second stage of the bonus game, as indicated by block 108. In this example, the second stage includes a plurality of different potential second stage outcomes, a first quantity of which are each associated with an award of one or more elements, and a second quantity of which are each associated with a second stage termination event. It should be appreciated that each of the first quantity of the potential second stage outcomes are different from one another, each of the second quantity of the potential second stage outcomes are different from one another, and each of the first quantity of the potential second stage outcomes are different from each of the second quantity of the potential second stage outcomes.

The gaming system determines one of the potential second stage outcomes, as indicated by block 109. The gaming system determines whether the second stage termination event occurred during play of the second stage, as indicated by diamond 110. More specifically, in this example, the gaming system determines whether the determined second stage outcome is one of the first quantity or one of the second quantity of the potential second stage outcomes. If the second stage termination event does not occur (i.e., if the determined second stage outcome is one of the first quantity of the potential second stage outcomes and not one of the second quantity of the potential second stage outcomes), the gaming system adds a quantity of elements to the player's total quantity of elements, as indicated by block 111. The gaming system determines whether an alternative second stage termination event occurred, as indicated by diamond 112. More specifically, the gaming system determines whether the player has accumulated a maximum quantity of elements. If the alternative second stage termination event has not occurred (i.e., if the player has not accumulated the maximum quantity of elements), the process returns to block 109. If the alternative second stage termination event has occurred (i.e., if the player has accumulated the maximum quantity of elements), the process proceeds to block 113, described below.

After the second stage termination event or the alternative second stage termination event occurs, the gaming system: (a) determines any second stage awards based on the total quantity of elements accumulated by the player; (b) provides any determined first stage awards and any determined second stage awards; and (c) ends or terminates the second stage, thereby ending or terminating the bonus game, as indicated by block 113.

FIGS. 4A, 4B, 4C, 5A, 5B, 5C, 5D, 6A, 6B, 6C, 6D, and 6E illustrate screen shots of an example of one embodiment of the gaming system and gaming device of the present disclosure. In this embodiment, the gaming system or gaming device (collectively referred to herein as the "gaming system") is configured to operate a primary wagering game (sometimes referred to herein as the "primary game") that is a spinning reel type game. The primary game includes a plurality of symbols including a BONUS symbol. In this embodiment, when the BONUS symbol is generated and displayed along a wagered-on payline, the bonus game and, more particularly, the first stage, is initiated (as described in detail below). That is, in this embodiment, the first stage triggering event occurs when the BONUS symbol is generated and displayed along a wagered-on payline during play of the primary game, though it should be appreciated that any suitable triggering event may be employed.

Figure 4A:
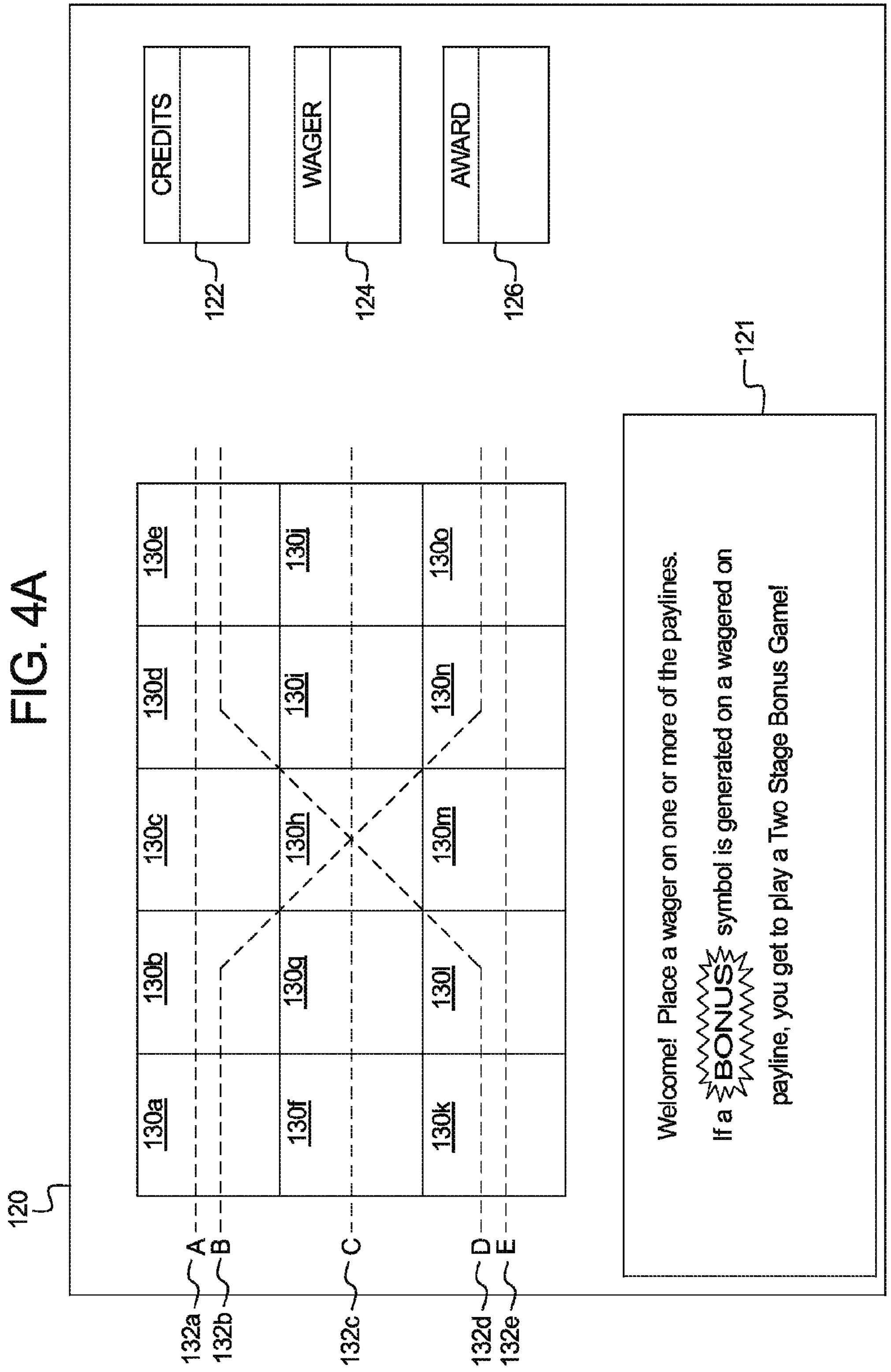
FIGS. 4A, 4B, and 4C are front views of a display device of the gaming system of one embodiment of the present disclosure, and illustrate an example play of an example primary spinning reel type game.
Figure 4B:
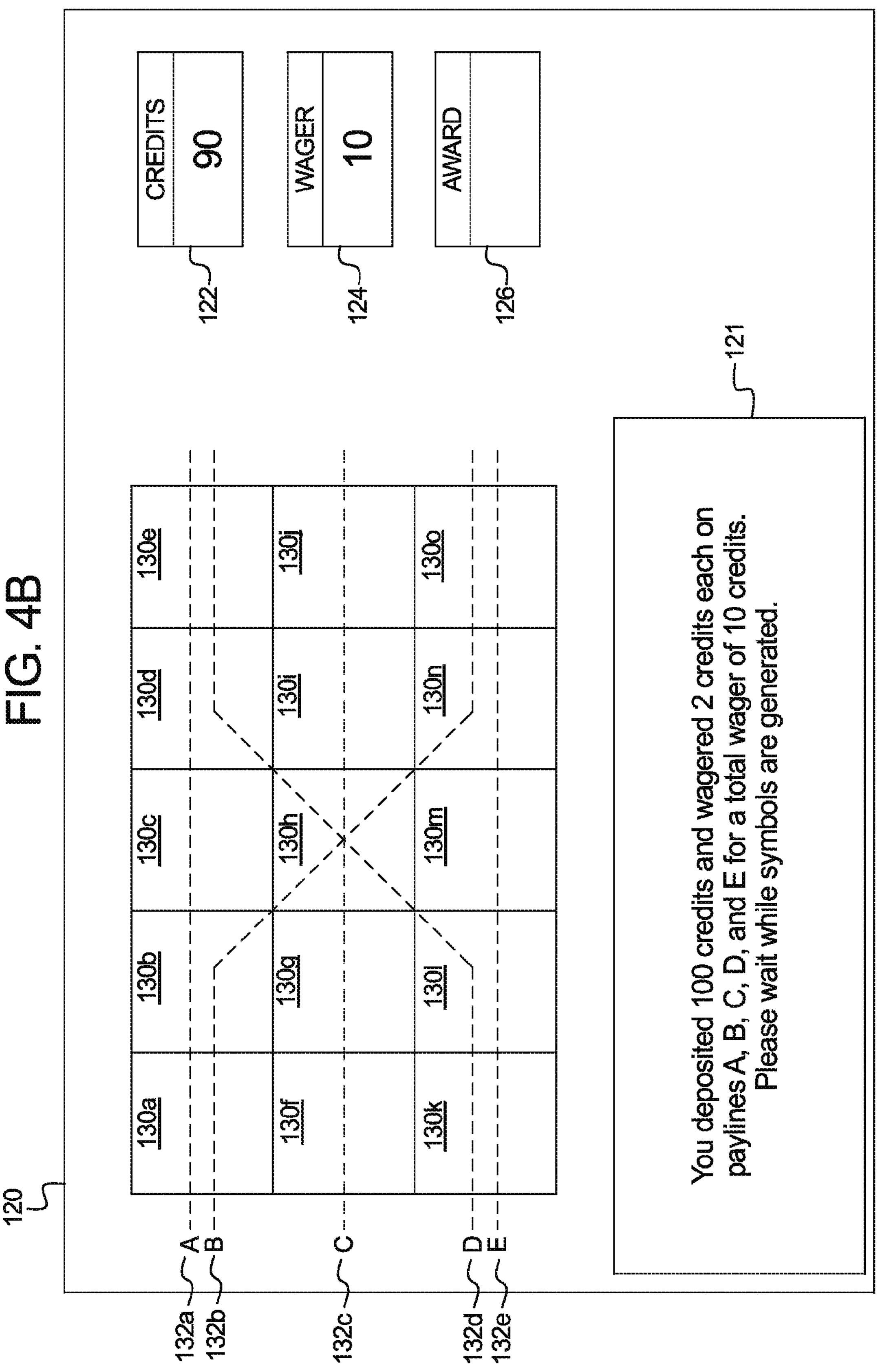
Figure 4C:
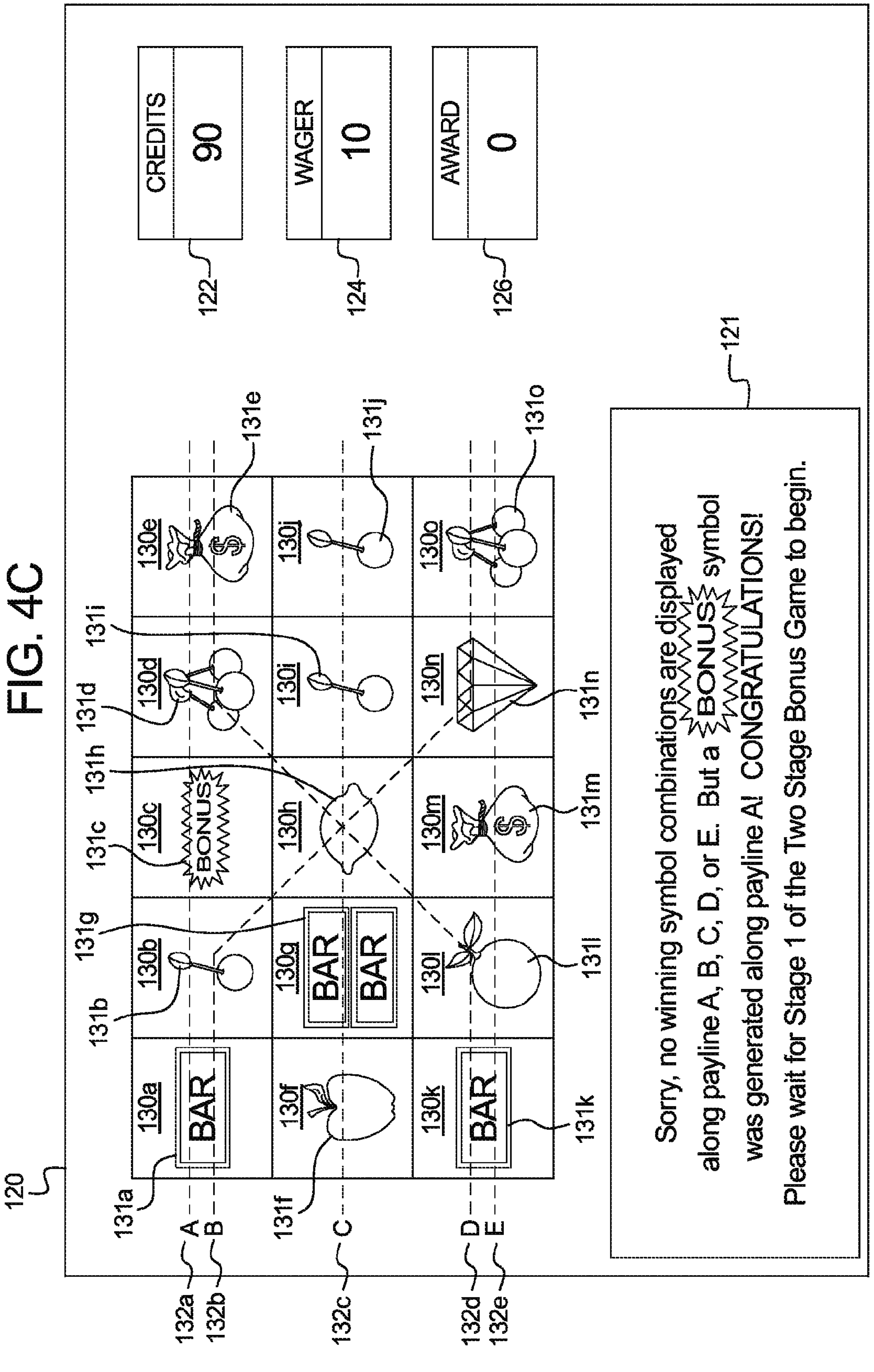

In this example embodiment, the bonus game includes: (a) the alternative second stage triggering event in addition to the second stage triggering event, (b) the alternative second stage termination event in addition to the second stage termination event, (c) the threshold second stage outcome FIGS. 4A, 4B, and 4C illustrate screen shots of an example embodiment of the primary game. In this embodiment, a display device 120 of the gaming system displays symbol display areas 130*a*, 130*b*, 130*c*, 130*d*, 130*e*, 130*f*, 130*g*, 130*h*, 130*i*, 130*j*, 130*k*, 130*l*, 130*m*, 130*n*, and 130*o* in a 3×5 grid or matrix. Display device 120 displays a plurality of paylines for the primary game, each of which is associated with a different plurality of the symbol display areas. Specifically, payline A 132*a* is associated with symbol display areas 130*a*, 130*b*, 130*c*, 130*d*, and 130*e*; payline B 132*b* is associated with symbol display areas 130*a*, 130*b*, 130*h*, 130*n*, and 130*o*; payline C 132*c* is associated with symbol display areas 130*f*, 130*g*, 130*h*, 130*i*, and 130*j*; payline D 132*d* is associated with symbol display areas 130*k*, 1301, 130*h*, 130*d*, and 130*e*; and payline E 132*e* is associated with symbol display areas 130*k*, 130*l*, 130*m*, 130*n*, and 130*o*. For brevity, payline A 132*a*, payline B 132*b*, payline C 132*c*, payline D 132*d*, and payline E 132*e* are sometimes referred to herein as paylines A, B, C, D, and E.

Display device 120 displays an indication, notification, or message display area 121, which displays information, notifications, and/or messages before, during, or after play; a credit meter 122, which indicates the player's credit balance; a wager indicator or display 124, which indicates any wager placed by the player for a play of the primary game; and an award indicator or display 126, which indicates any award a player has won during a play of the primary game.

It should be appreciated that, in various embodiments: (a) the display device may display any suitable quantity of symbol display areas in any suitable configuration or arrangement; (b) the display device may display any suitable quantity of paylines; (c) each of the displayed paylines may be associated with any suitable quantity of the symbol display areas; (d) each of the displayed paylines may be associated with any suitable combination of the symbol display areas; (e) any suitable paytable including any suitable quantity of winning symbol combinations may be used for the primary game; (f) any suitable combinations of the symbols may be used as winning symbol combinations for the primary game; (g) the winning symbol combinations may be associated with any suitable credit payouts for the primary game; (h) any suitable quantity of paytables may be used for the primary game; and (i) any suitable symbols may be used for the primary game, such as letters, numbers, illustrations or pictures of objects, or any other suitable markings or indicia.

As illustrated in FIG. 4A, when the gaming system is not being played, message display areas 121 displays a message that invites a player to place a wager on one or more paylines for a play of the primary game. The message notifies the player that if a BONUS symbol is generated and displayed on a wagered-on payline, the player will get to play a multi-stage dice bonus game.

As illustrated in FIG. 4B, the player deposits currency and is provided with 100 credits, which are displayed in credit meter 122. As displayed in message display area 121, the player initiates a play of the primary game by placing a wager of two credits on each of paylines A, B, C, D, and E for a total wager of 10 credits, which is indicated in wager indicator 124.

As illustrated in FIG. 4C, symbols 131*a*, 131*b*, 131*c*, 131*d*, 131*e*, 131*f*, 131*g*, 131*h*, 131*i*, 131*j*, 131*k*, 131*l*, 131*m*, 131*n*, and 131*o* are generated and displayed at symbol display areas 130*a*, 130*b*, 130*c*, 130*d*, 130*e*, 130*f*, 130*g*, 130*h*, 130*i*, 130*j*, 130*k*, 130*l*, 130*m*, 130*n*, and 130*o*, respectively. As indicated by the message displayed in message display area 121, no winning symbol combinations are displayed in the symbol display areas. Accordingly, an award of 0 credits is displayed in award indicator 126. However, BONUS symbol 131*c* was generated and displayed in symbol display area 130*c*, which is associated with wagered-on payline A. That is, the first stage triggering event occurred during the play of the primary game. Thus, the bonus game and, more specifically, the first stage of the bonus game, is initiated. Message display area 121 displays a message instructing the player to wait for the first stage to begin.

FIGS. 5A, 5B, 5C, and 5D illustrate screen shots of an example embodiment of the first stage. The first stage includes a plurality of potential first stage outcomes, which include each potential outcome of a roll of two standard, six-sided dice. A first quantity of the potential first stage outcomes are each associated with a first stage award, and a second quantity of the potential first stage outcomes are each associated with a second stage triggering event. Generally, during play of the first stage, the gaming system enables the player to roll the dice, each roll resulting in one of the potential first stage outcomes, until either: (a) the second stage triggering event occurs, or (b) the alternative second stage triggering event occurs. Upon the occurrence of one of those triggering events, the gaming device ends or terminates the first stage and initiates the second stage.

Figure 5A:
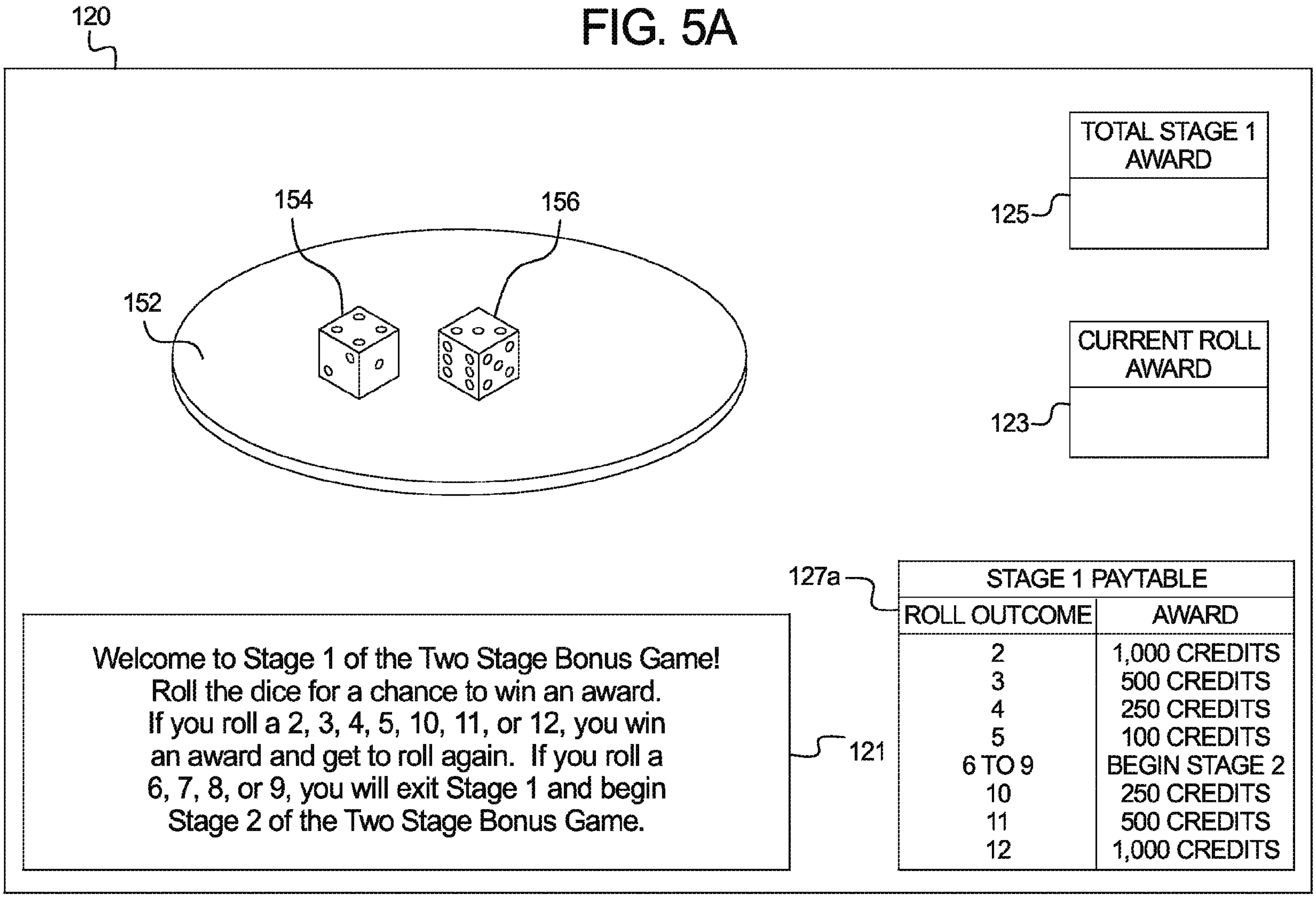
FIGS. 5A, 5B, 5C, and 5D are front views of a display device of the gaming system of FIGS. 4A, 4B, and 4C, and illustrate a plurality of example rolls of the first stage of the multi-stage dice bonus game, wherein the multi-stage dice bonus game includes: (a) the alternative second stage triggering event in addition to the second stage triggering event, (b) the alternative second stage termination event in addition to the second stage termination event, and (c) the threshold second stage outcome.

As shown in FIG. 5A, display device 120 displays a table 152 and a first die 154 and a second die 156 atop table 152. Display device 120 also displays message display area 121; a current roll award indicator or display 123, which indicates any award provided to the player for the current roll of dice 154 and 156; a total first stage award meter 125, which indicates a total of any awards provided to the player in during play of the first stage; and a first stage paytable 127*a*.

In this embodiment, dice 154 and 156 are standard, six-sided dice. Put differently, each side of each of dice 154 and 156 displays a different one of the numbers 1, 2, 3, 4, 5, and 6. Thus, for a given roll of dice 154 and 156, the potential first stage outcomes for that roll are: 2, 3, 4, 5, 6, 7, 8, 9, 10, 11, and 12. First stage paytable 127*a* lists each of the potential first stage outcomes and indicates, for each of the potential first stage outcomes, whether that potential first stage outcome is associated with: (a) a first stage award, or (b) the second stage triggering event. More specifically, in this example, paytable 127*a* indicates that: potential first stage outcomes 2 and 12 are associated with a first stage award of 1,000 credits; potential first stage outcomes 3 and 11 are associated with a first stage award of 500 credits; potential first stage outcomes 4 and 10 are associated with a first stage award of 250 credits; potential first stage outcome 5 is associated with a first stage award of 100 credits; and potential first stage outcomes 6, 7, 8, or 9 are associated with the second stage triggering event. That is, the second stage triggering event occurs when the determined first stage outcome of a roll of dice 154 and 156 is 6, 7, 8, or 9. Thus, in this example, the first quantity of the potential first stage outcomes includes potential first stage outcomes 2, 3, 4, 5, 10, 11, and 12, and the second quantity of the potential first stage outcomes includes potential first stage outcomes 6, 7, 8, and 9.

As illustrated in FIG. 5A, upon initiation of the first stage, message display 121 displays a message requesting that the player roll the dice by, for example, inputting a dice roll input to the gaming system (as described above). The message indicates that: (a) if the outcome of the roll is a 2, 3, 4, 5, 10, 11, or 12 (i.e., one of the first quantity of the potential first stage outcomes), the player receives a first stage award and gets to roll again; and (b) if the outcome of the roll is a 6, 7, 8, or 9 (i.e., one of the second quantity of the potential first stage outcomes), the first stage ends or terminates and the second stage is initiated.

Figure 5B:
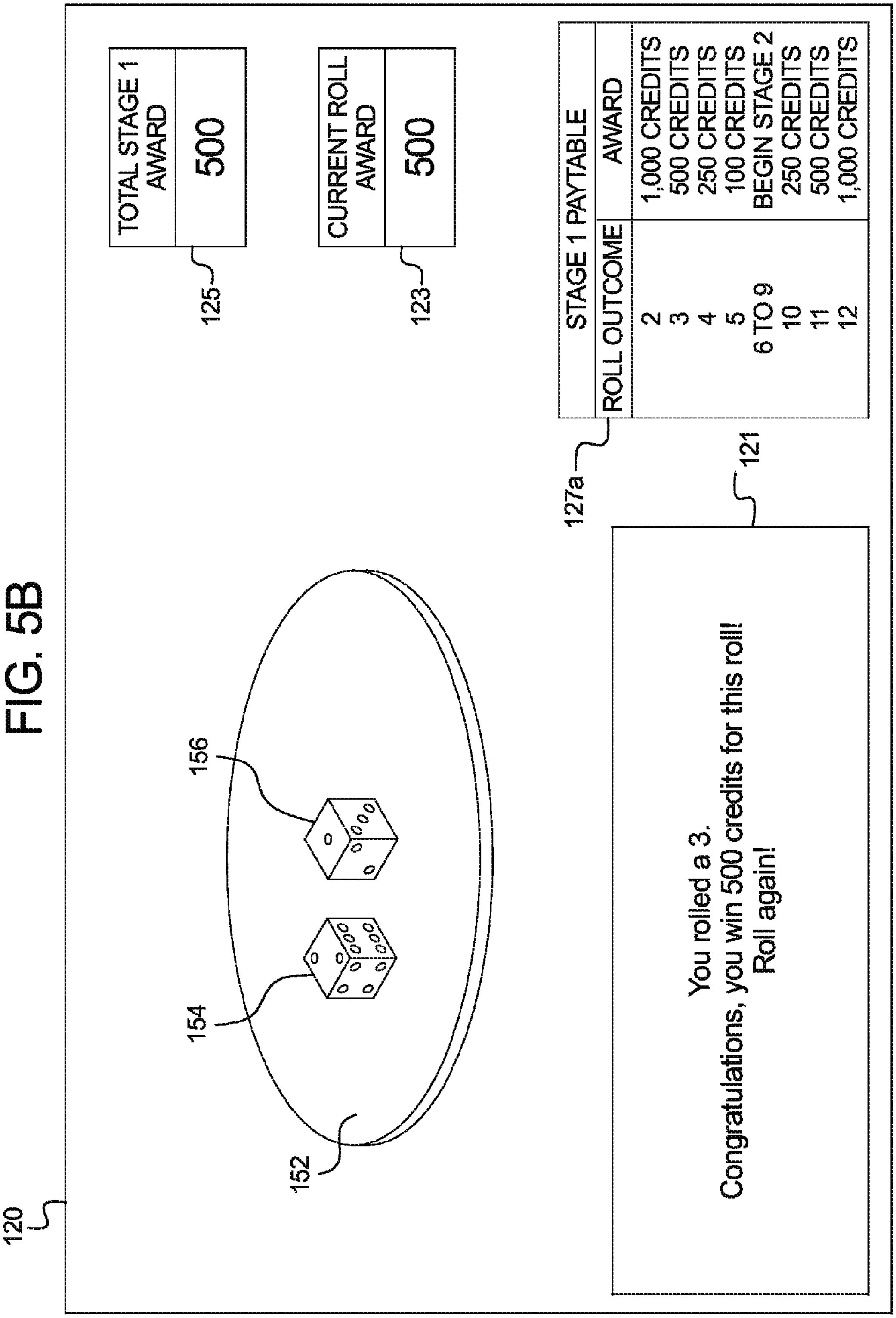

As illustrated in FIG. 5B, the player rolled dice 154 and 156 for the first time in the first stage. The gaming system determined, using one of the manners described above, the first stage outcome of 3 for the first roll of the first stage, and displayed dice 154 and 156 rolling and coming to rest on table 152 displaying the numbers 2 and 1, respectively. The first stage outcome of 3 for the first roll is one of the first quantity of the potential first stage outcomes. Accordingly, the gaming system provides the player with the first stage award associated with the first stage outcome of 3, which is 500 credits in this example (as indicated by first stage paytable 127*a*). The gaming system displays this first stage award of 500 credits in current roll award display 123. The gaming system displays a total first stage award of 500 credits in total first stage award display 125 since this was the first roll of the first stage.

In this embodiment, the first stage ends or terminates (and the second stage initiates) when either: (a) a determined outcome of a roll of the dice in the first stage is one of the second quantity of the potential first stage outcomes (i.e., when the second stage triggering event occurs); or (b) the player rolls the dice a maximum quantity of times in the first stage (i.e., when the alternative second stage triggering event occurs). In this example embodiment, the maximum quantity of times is ten. Thus, in this embodiment, for a given roll, if the second stage triggering event does not occur, the gaming system determines whether the player has rolled the dice the maximum quantity of times in the first stage (to determine whether the alternative second stage triggering event has occurred).

Figure 5C:
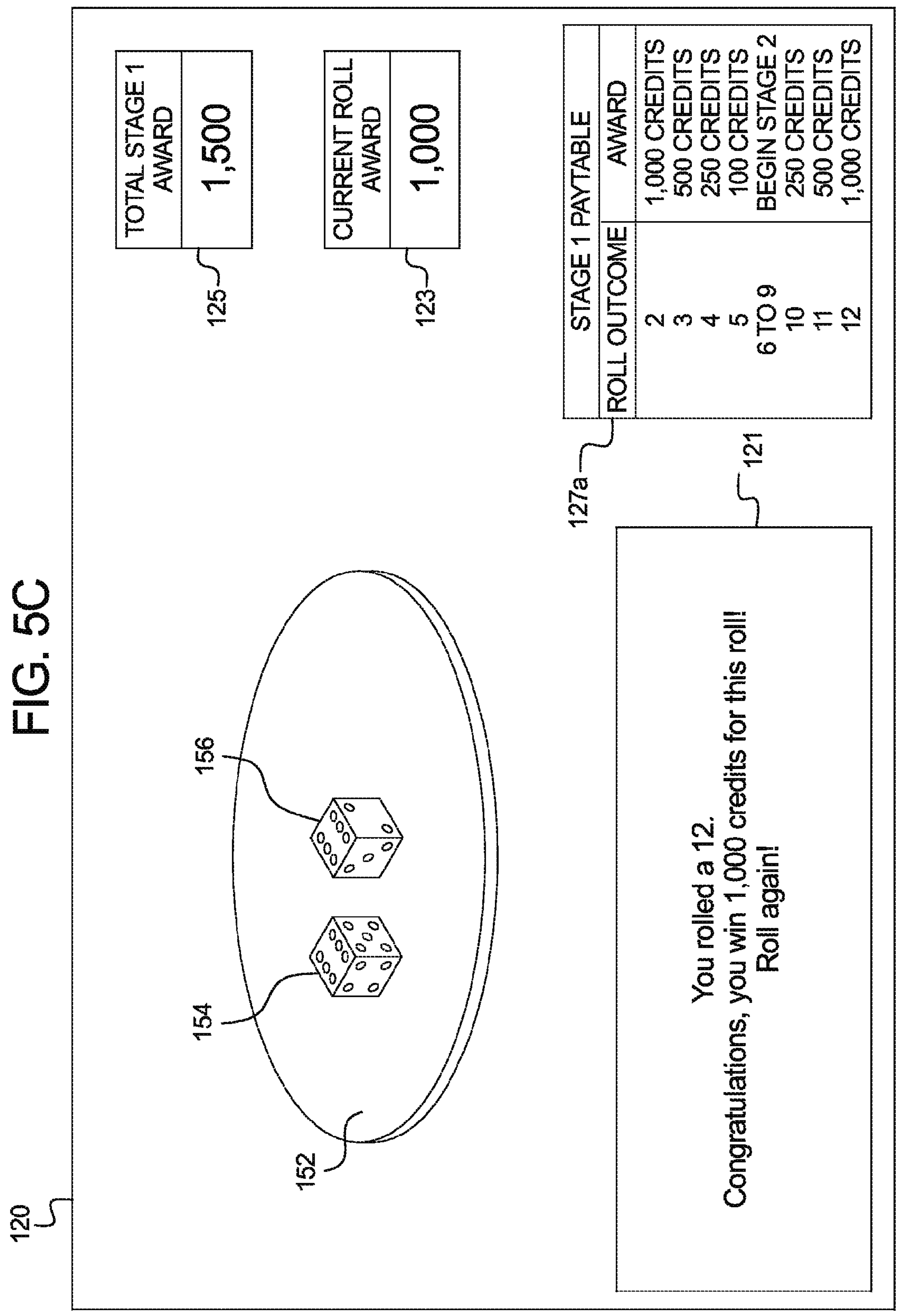

Since, in this example, the player has rolled the dice fewer than the maximum quantity of rolls (i.e., fewer than ten times) in the first stage, and since the second stage triggering event has not occurred, the gaming system enables the player to roll again. FIG. 5C illustrates the result of the second roll of the first stage. Specifically, the gaming system determined the first stage outcome of 12 for the second roll of the first stage, and displayed dice 154 and 156 rolling and coming to rest displaying the numbers 6 and 6, respectively. The first stage outcome of 12 for the second roll is one of the first quantity of the potential first stage outcomes. Accordingly, the gaming system provides the player with the first stage award associated with the first stage outcome of 12, which is 1,000 credits in this example (as indicated by first stage paytable 127*a*). The gaming system displays this first stage award of 1,000 credits in current roll award display 123. The gaming system updates total first stage award display 125 to display the sum of this first stage award of 1,000 credits and the first stage award of 500 credits won as a result of the first roll of the first stage, resulting in a total first stage award of 1,500 credits.

Figure 5D:
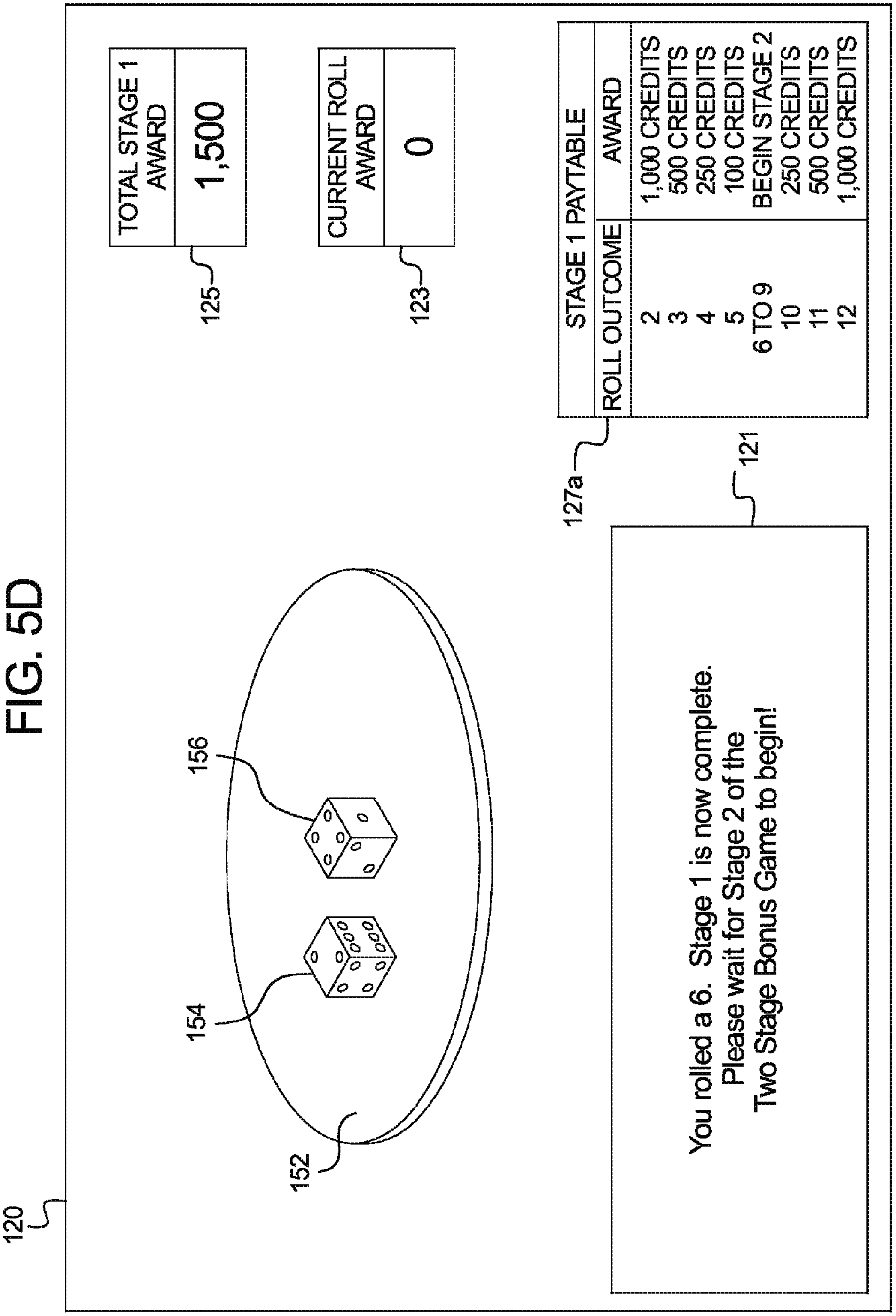

Since, in this example, the player has rolled the dice fewer than the maximum quantity of rolls (i.e., fewer than ten times) in the first stage, and since the second stage triggering event has not occurred, the gaming system enables the player to roll again. FIG. 5D illustrates the result of the third roll of the first stage. Specifically, the gaming system determined the first stage outcome of 6 for the third roll of the first stage, and displayed dice 154 and 156 rolling and coming to rest displaying the numbers 2 and 4, respectively. The first stage outcome of 6 for the third roll is one of the second quantity of the potential first stage outcomes. In other words, this roll results in the occurrence of the second stage triggering event. Accordingly, the gaming system ends or terminates the first stage and initiates the second stage.

FIGS. 6A, 6B, 6C, 6D, and 6E illustrate screen shots of an example embodiment of the second stage. As explained in detail above, the second stage includes a plurality of potential second stage outcomes. In this example, the plurality of potential second stage outcomes are identical to the plurality of potential first stage outcomes. Thus, in this example, the plurality of potential second stage outcomes represent each of the potential outcomes of a roll of a pair of standard, six-sided dice. In this embodiment, the gaming device designates whichever determined first stage outcome that resulted in the triggering of the second stage via the second stage triggering event as the threshold one of the second stage numbers. Also, in this example, the first quantity of the potential second stage outcomes includes the potential second stage outcomes greater than the threshold second stage outcome, and the second quantity of the potential second stage outcomes includes the potential second stage outcomes greater than the threshold second stage outcome. Generally, during play of the second stage, the gaming system enables the player to roll the dice, each roll of which results in one of the potential second stage outcomes, until either: (a) the second stage termination event occurs, or (b) the alternative second stage termination event occurs. Upon the occurrence of one of those termination events, the gaming device ends or terminates the second stage, thereby ending or terminating the bonus game.

In this example, the determined first stage outcome of 6, which was one of the second quantity of the potential first stage outcomes, triggered the second stage. Thus, in this example: (a) the threshold second stage outcome is 6; (b) the first quantity of the potential second stage outcomes are 7, 8, 9, 10, 11, and 12; and (c) the second quantity of the potential second stage outcomes are 2, 3, 4, and 5.

Figure 6A:
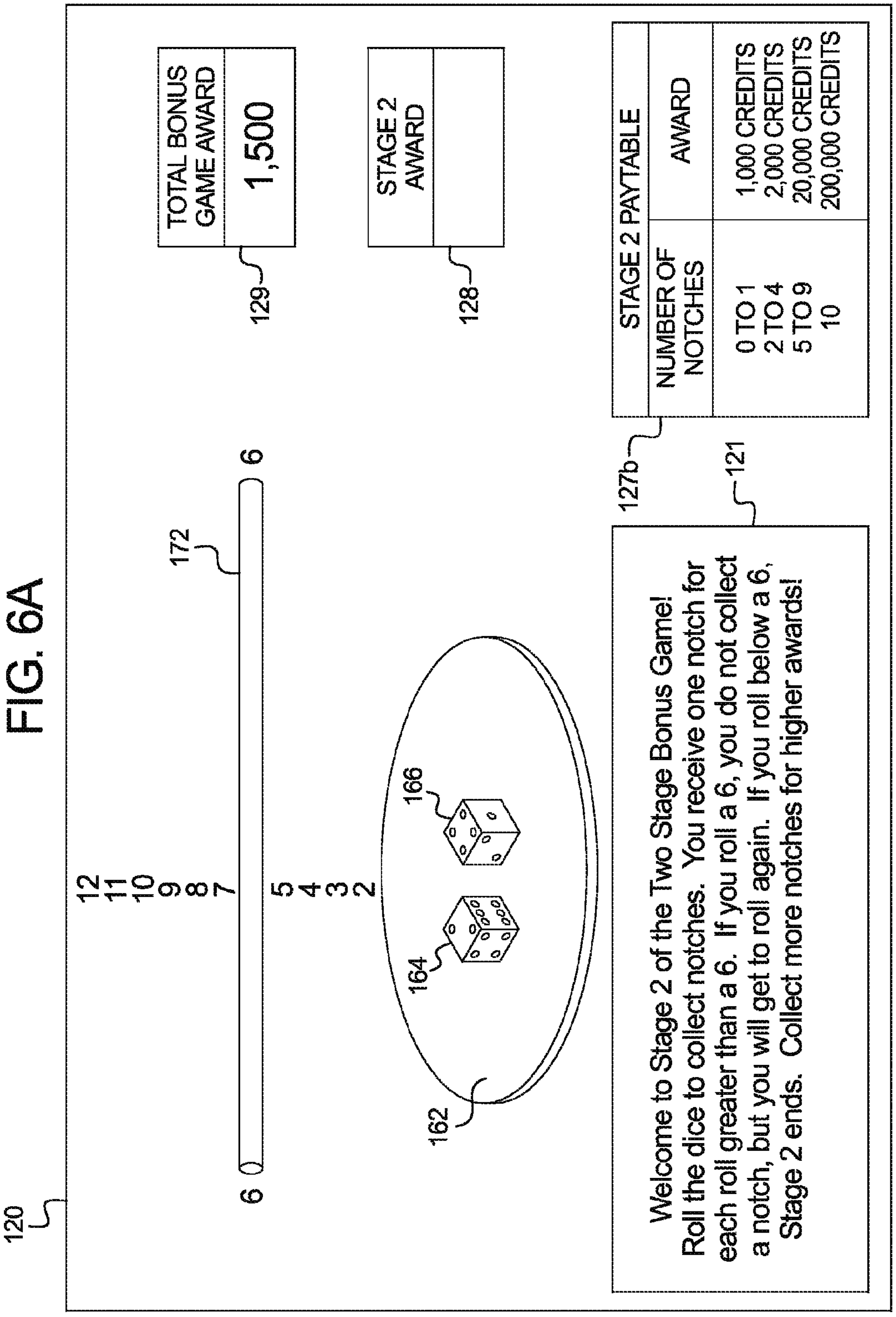
FIGS. 6A, 6B, 6C, 6D, and 6E are front views of a display device of the gaming system of FIGS. 4A, 4B, and 4C, and illustrate a plurality of example rolls of the second stage of the multi-stage dice bonus game, wherein the multi-stage dice bonus game includes: (a) the alternative second stage triggering event in addition to the second stage triggering event, (b) the alternative second stage termination event in addition to the second stage termination event, (c) the threshold second stage outcome.

As illustrated in FIG. 6A, display device 120 displays a table 162 and a first die 164 and a second die 166 atop table 162. Display device 120 also displays: an element display area 172 that is configured to display any elements accumulated by the player during play of the second stage; message display area 121; a second stage awards indicator or display 128, which indicates any second stage awards provided to the player; a multi-stage dice bonus game award meter 129, which indicates a total of any first stage awards and any second stage awards provided to the player in during play of the bonus game; and a second stage paytable 127*b*.

In this example, dice 164 and 166 are standard, six-sided dice. Put differently, each side of each of dice 164 and 166 displays a different one of the numbers 1, 2, 3, 4, 5, and 6. Thus, for a given roll of dice 154 and 156, the potential second stage outcomes for that roll are: 2, 3, 4, 5, 6, 7, 8, 9, 10, 11, and 12. Second stage paytable 127*b* lists each of the awards available to be won in the second stage in association with the total quantity of elements (which are notches in this example) that a player must accumulate before the second stage ends or terminates to receive that second stage award. More specifically, in this example, paytable 127*b* indicates that: a total quantity of 0 to 1 elements is associated with a second stage awards of 1,000 credits; a total quantity of 2 to 4 elements is associated with a second stage awards of 2,000 credits; a total quantity of 5 to 9 elements is associated with a second stage awards of 20,000 credits; and a total quantity of 10 elements is associated with a second stage awards of 200,000 credits. That is, upon termination of the second stage, the gaming system provides the player: (a) a second stage award of 1,000 credits if the player accumulated a total quantity of 0 or 1 elements during play of the second stage; (b) a second stage award of 2,000 credits if the player accumulated a total quantity of 2, 3, or 4 elements during play of the second stage; (c) a second stage award of 20,000 credits if the player accumulated a total quantity of 5, 6, 7, 8, or 9 elements during play of the second stage, and (d) a second stage award of 200,000 credits if the player accumulated a total quantity of 10 elements during play of the second stage.

As illustrated in FIG. 6A, upon initiation of the second stage, message display 121 displays a message requesting that the player roll the dice by, for example, inputting a dice roll input to the gaming system. The message indicates that: (a) the gaming system will provide the player one notch (i.e., element) for a roll resulting in a second stage outcome higher than a 6 (i.e., if the gaming system determines one of the first plurality of potential second stage outcomes for that roll), and enable the player to roll again; (b) the gaming system will not provide the player with any notches for a roll resulting in a second stage outcome of 6 (i.e., if the gaming system determines the threshold second stage outcome for that roll), but will enable the player to roll again; and (c) the gaming system will not provide the player with any notches and will end or terminate the second stage for a roll resulting in a second stage outcome lower than 6 (i.e., if the gaming system determines one of the second plurality of the potential second stage outcomes for that roll).

Figure 6B:
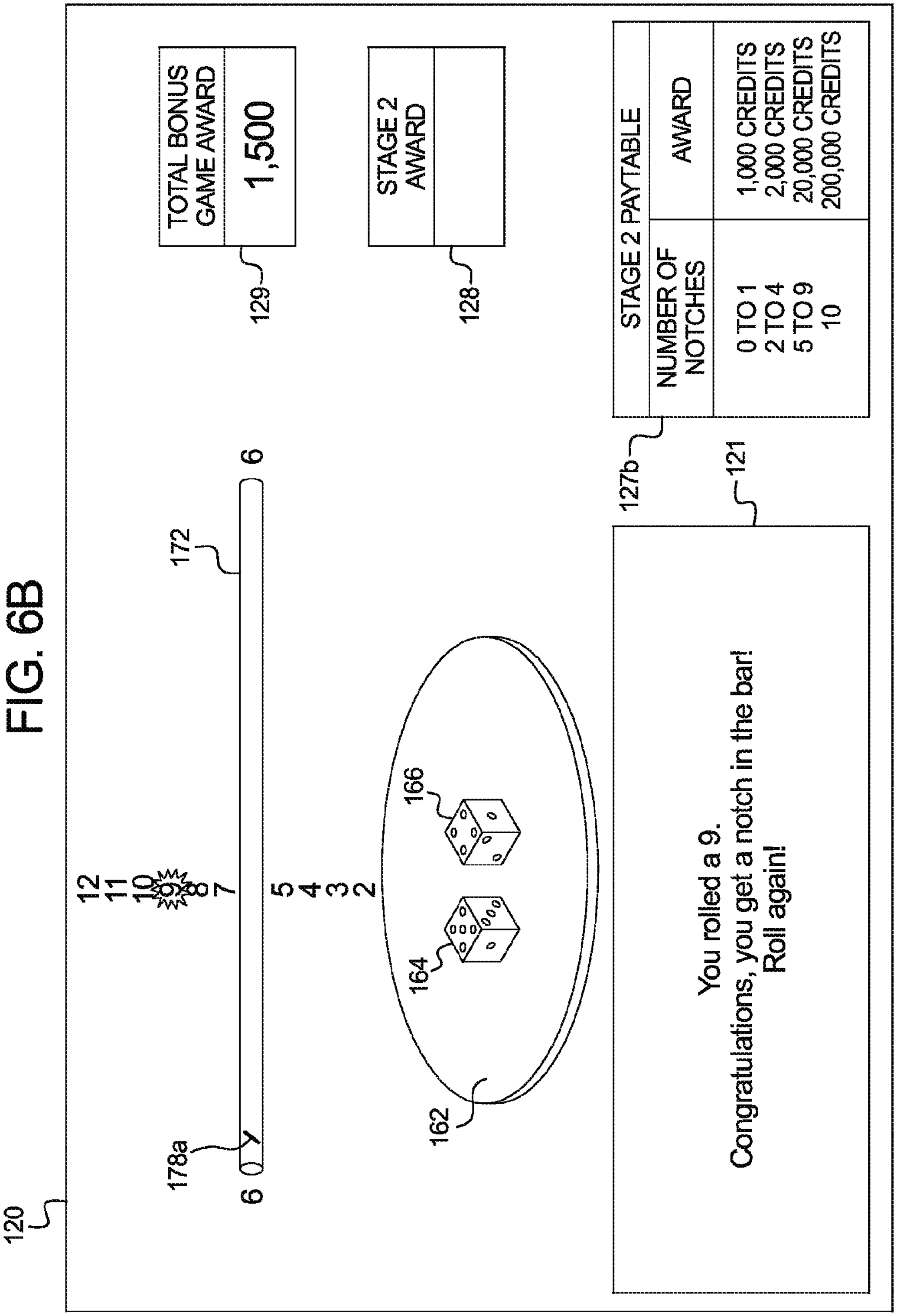

As illustrated in FIG. 6B, the player rolled dice 164 and 166 for the first time in the second stage. The gaming system determined a second stage outcome of 9 for the first roll of the second stage, and displayed dice 164 and 166 rolling and coming to rest displaying the numbers 5 and 4, respectively. The second stage outcome of 9 for the first roll is one of the first quantity of the potential second stage outcomes; that is, the second stage outcome of 9 for the first roll is greater than the threshold second stage outcome of 6. Accordingly, the gaming system provides the player with a notch 178*a*, and displays notch 178*a* in element display area 172.

In this embodiment, the second stage ends or terminates when either: (a) the gaming system determines one of the second quantity of the potential second stage outcomes for a roll of the dice during the second stage (i.e., the second stage termination event occurs); or (b) the player accumulates a maximum quantity of elements (i.e., the alternative second stage termination event occurs). In this example embodiment, the maximum quantity of elements is ten. Thus, in this embodiment, for a given roll, if the second stage termination event does not occur, the gaming system determines whether the player has accumulated the maximum quantity of elements (to determine whether the alternative second stage termination event has occurred).

Figure 6C:
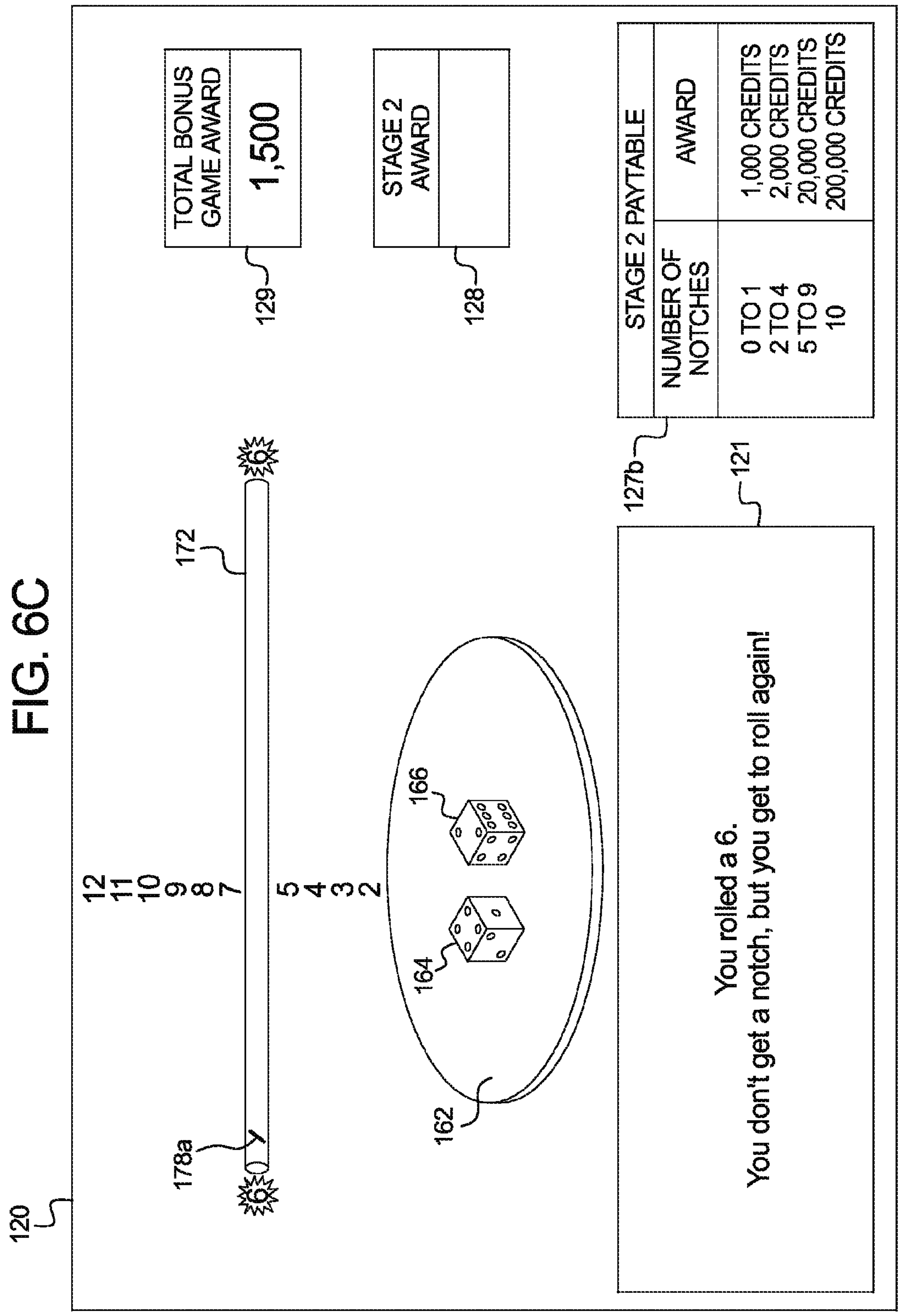

Since, in this example, the player has not accumulated the maximum quantity of notches (i.e., ten notches), and the second stage termination event has not occurred, the gaming system enables the player to roll again. FIG. 6C illustrates the result of the second roll of the first stage. Specifically, the gaming system determined the second stage outcome of 6 for the second roll of the second stage, and displayed dice 164 and 166 rolling and coming to rest displaying the numbers 4 and 2, respectively. The second stage outcome of 6 for the second roll is the threshold second stage outcome. Accordingly, the gaming system does not provide the player with any notches but enables the player to roll again.

Figure 6D:
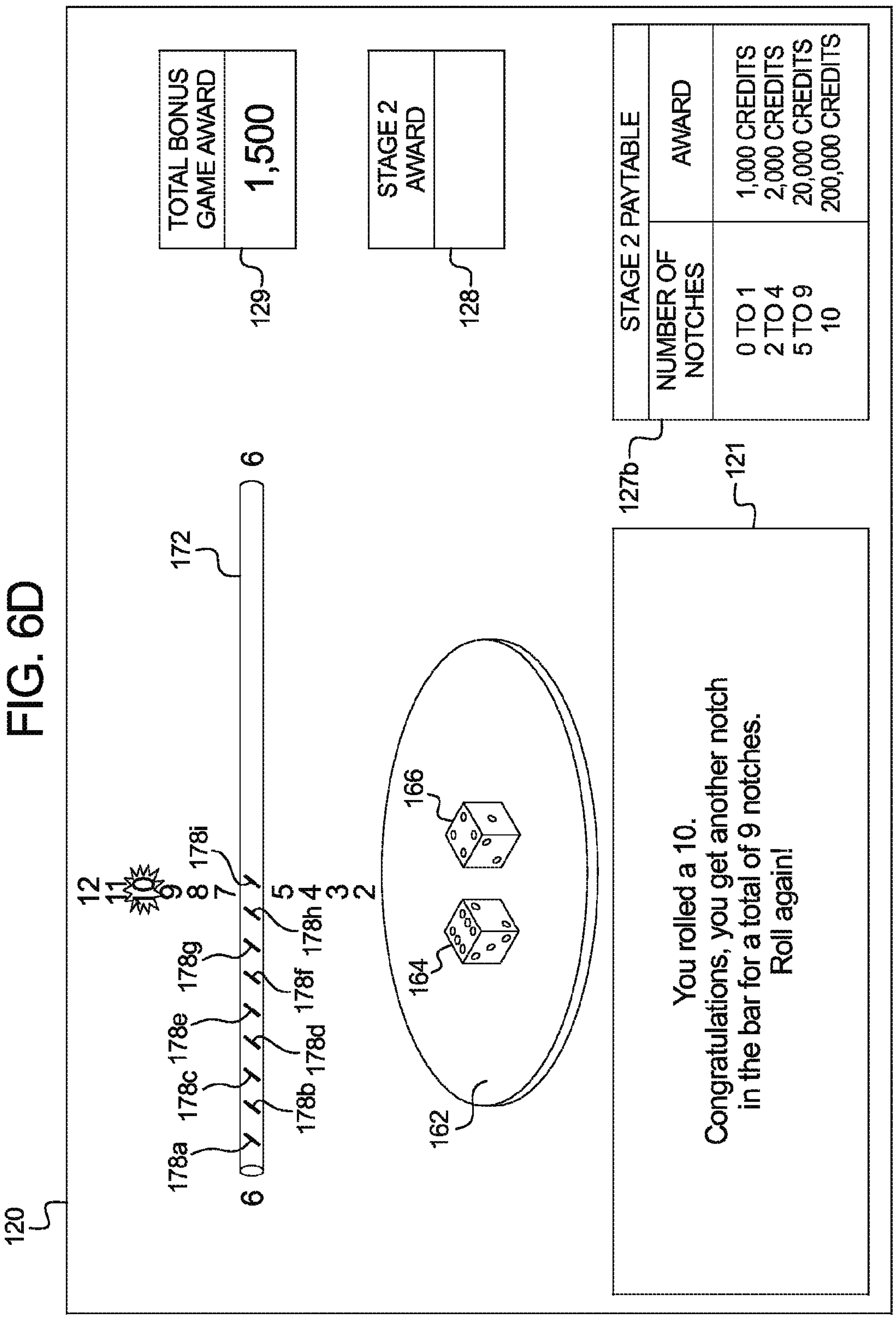

FIG. 6D illustrates the result of the tenth roll of the second stage. Specifically, the gaming system determined the second stage outcome of 10 for the tenth roll of the second stage, and displayed dice 164 and 166 rolling and coming to rest displaying the numbers 6 and 4, respectively. The second stage outcome of 10 for the tenth roll is one of the first quantity of the potential second stage outcomes; that is, the second stage outcome of 10 for the tenth roll is greater than the threshold second stage outcome of 6. Accordingly, the gaming system provides the player with a notch 178*i*, and displays notch 178*i* in element display area 172. It should be appreciated that, since element display area 172 also displays notches 178*b*, 178*c*, 178*d*, 178*e*, 178*f*, 178*g*, and 178*h*, that the third, fourth, fifth, sixth, seventh, eighth, and ninth rolls of the second stage also resulted in one of the first plurality of the potential second stage outcomes.

Figure 6E:
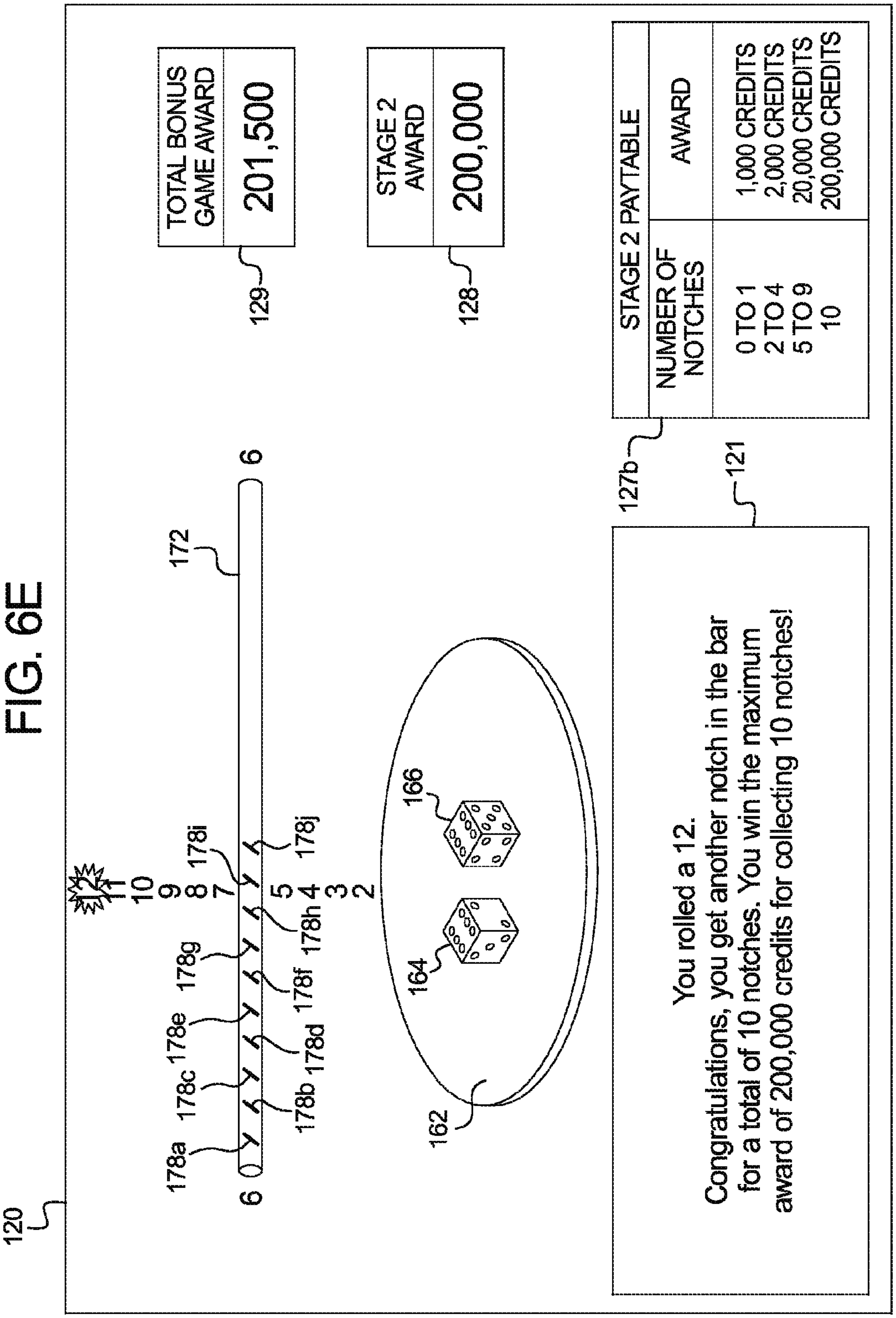

Since, in this example, the player has not accumulated the maximum quantity of notches (i.e., ten notches), and the second stage termination event has not occurred, the gaming system enables the player to roll again. FIG. 6E illustrates the result of the eleventh roll of the second stage. Specifically, the gaming system determined the second stage outcome of 12 for the eleventh roll of the second stage, and displayed dice 164 and 166 rolling and coming to rest displaying the numbers 6 and 6, respectively. The second stage outcome of 12 for the eleventh roll is one of the first quantity of the potential second stage outcomes; that is, the second stage outcome of 12 for the eleventh roll is greater than the threshold second stage outcome of 6. Accordingly, the gaming system provides the player with a notch 178*j*, and displays notch 178*j* in element display area 172.

Notch 178*j* is the tenth notch the player accumulated. That is, the player has accumulated the maximum quantity of notches during play of the second stage. Accordingly, the alternative second stage termination event occurs, causing the gaming system to end or terminate the second stage and determine any second stage awards based on the total quantity of notches the player accumulated (which in this example is the maximum quantity of ten notches). As indicated in paytable 127*b*, the gaming system determines an award of 200,000 credits associated with the total quantity of ten notches that the player accumulated during play of the second stage, and displays that award in second stage award display 128. Similarly, the gaming system displays the sum of the determined first stage awards of 1,500 credits and the determined second stage award of 200,000 credits, and displays that sum in total bonus game award display 129. The gaming system provides the determined first stage awards and the determined second stage awards to the player and ends or terminates the second stage, thereby ending or terminating the bonus game.

While the above embodiments describe the multi-stage dice bonus game being implemented by a video gaming system or device, it should be appreciated that in various embodiments the bonus game may be implemented as a table game. That is, in these embodiments, a player rolls physical dice and the bonus game is directed by a dealer.

In certain embodiments, the multi-stage dice bonus game is implemented as a community game and can played simultaneously by a plurality of players. In one embodiment, the gaming system includes a plurality of gaming devices, each of which is configured to operate one or more primary games. When a first player of a first one of the gaming devices triggers the first stage of the bonus game via the first stage triggering event, the gaming system causes each of the other gaming devices to notify the player (if any) of that gaming device that the first player triggered the bonus game by, for example, causing each of the gaming devices to display a message.

The first one of the gaming devices then enables the first player to play the first stage. During play of the first stage, if the gaming device determines one of the first plurality of the potential first stage outcomes, the gaming device provides the first player with a predetermined percentage, such as half, of any first stage award associated with the determined outcome, and adds the remaining portion to a communal progressive award pool. The first gaming device enables the first player to play the first stage until either: (a) the second stage triggering event occurs, or (b) the alternative second stage triggering event occurs, as generally explained above.

When the second stage is triggered, the gaming device of each eligible player of one of the gaming devices of the gaming system enables that player to play a communal version of second stage. More specifically, the gaming device of each eligible player enables that player to that player's set of dice. The gaming device then determines an outcome for each of the rolls. Each of the players that rolls one of the second quantity of the potential second stage outcomes is eliminated from the second stage. Each of the players that rolls one of the first quantity of the potential second stage outcomes rolls again. This process continues until a predetermined quantity of players, such as one player, remains. The gaming system provides the remaining player with a predetermined portion of the communal progressive award pool, and the gaming system provides the remaining portion of the communal progressive award pool to the first player (i.e., the player who triggered the bonus game).

In various embodiments, the bonus game is implemented using a certain progressive "thin client" platform. In these embodiments, the gaming system includes a plurality of gaming devices, each of which is configured to operate one or more primary games. When a player of one of the gaming devices places a wager for a play of the primary game or games, the gaming system allocates a portion of that wager to a progressive award pool. The gaming system determines whether to trigger the bonus game in association with that play of the primary game. If the gaming system determines to trigger the bonus game, the gaming system assumes control of the gaming device to display the bonus game. In certain embodiments, the gaming system presents the bonus game on the gaming device using a flash overlay, though it should appreciated that the gaming system may present the bonus game on the gaming device in any suitable manner. In some embodiments, the player may win all or a portion of the progressive award pool during play of the bonus game.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) receive a wager from a player for a play of a primary game;

(b) initiate a first stage of a bonus game upon an occurrence of a first stage triggering event;

(c) for the first stage of the bonus game:

(i) determine one of a plurality of different potential first stage outcomes, the potential first stage outcomes including a first quantity of the potential first stage outcomes and a second quantity of the potential first stage outcomes, each of the first quantity of the potential first stage outcomes being different from each of the second quantity of the potential first stage outcomes;

(ii) if the determined first stage outcome is one of the first quantity of the potential first stage outcomes:

(A) determine a first stage award based on the determined first stage outcome;

(B) determine whether a quantity of first stage outcome determinations has reached a designated quantity of first stage outcome determinations;

(C) if the quantity of first stage outcome determinations has not reached the designated quantity of first stage outcome determinations:

(1) modify the quantity of first stage outcome determinations, and (2) repeat (c)(i) to (c)(iii); and (D) if the quantity of first stage outcome determinations has reached the designated quantity of first stage outcome determinations:

(1) determine a threshold second stage outcome, the threshold second stage outcome being one of a plurality of different second stage outcomes; and (2) initiate a second stage of the bonus game; and (iii) if the determined first stage outcome is one of the second quantity of the potential first stage outcomes:

(A) determine the threshold second stage outcome, and (B) initiate the second stage; and (d) for the second stage:

(i) determine one of the potential second stage outcomes;

(ii) if the determined second stage outcome is the threshold second stage outcome, repeat (d)(i) to (d)(iv);

(iii) if the determined second stage outcome is greater than the threshold second stage outcome:

(A) modify a total quantity of elements;

(B) determine whether the total quantity of elements has reached a designated quantity of elements;

(C) if the total quantity of elements has not reached the designated quantity of elements, repeat (d)(i) to (d)(iv);

(D) if the total quantity of elements has reached the designated quantity of elements:

(1) determine any second stage awards based on the total quantity of elements, and (2) provide any determined first stage awards and any determined second stage awards; and (iv) if the determined second stage outcome is less than the threshold second stage outcome:

(A) determine any second stage awards based on the total quantity of elements, and (B) provide any determined first stage awards and any determined second stage awards to the player.

2. A method of operating a gaming system, said method comprising:

(a) causing at least one processor to execute a plurality of instructions stored in at least one memory device to operate with at least one input device to receive a wager from a player for a play of a primary game;

(b) causing the at least one processor to execute the plurality of instructions to initiate a first stage of a bonus game upon an occurrence of a first stage triggering event;

(c) for the first stage of the bonus game, causing the at least one processor to execute the plurality of instructions to:

(i) determine one of a plurality of different potential first stage outcomes, the potential first stage outcomes including a first quantity of the potential first stage outcomes and a second quantity of the potential first stage outcomes, each of the first quantity of the potential first stage outcomes being different from each of the second quantity of the potential first stage outcomes;

(ii) if the determined first stage outcome is one of the first quantity of the potential first stage outcomes:

(A) determine a first stage award based on the determined first stage outcome;

(B) determine whether a quantity of first stage outcome determinations has reached a designated quantity of first stage outcome determinations;

(C) if the quantity of first stage outcome determinations has not reached the designated quantity of first stage outcome determinations:

(1) modify the quantity of first stage outcome determinations, and (2) repeat (c)(i) to (c)(iii); and (D) if the quantity of first stage outcome determinations has reached the designated quantity of first stage outcome determinations:

(1) determine a threshold second stage outcome, the threshold second stage outcome being one of a plurality of different second stage outcomes; and (2) initiate a second stage of the bonus game; and (iii) if the determined first stage outcome is one of the second quantity of the potential first stage outcomes:

(A) determine the threshold second stage outcome, and (B) initiate the second stage; and (d) for the second stage, causing the at least one processor to execute the plurality of instructions to:

(i) determine one of the potential second stage outcomes;

(ii) if the determined second stage outcome is the threshold second stage outcome, repeat (d)(i) to (d)(iv);

(iii) if the determined second stage outcome is greater than the threshold second stage outcome:

(A) modify a total quantity of elements;

(B) determine whether the total quantity of elements has reached a designated quantity of elements;

(C) if the total quantity of elements has not reached the designated quantity of elements, repeat (d)(i) to (d)(iv);

(D) if the total quantity of elements has reached the designated quantity of elements:

(1) determine any second stage awards based on the total quantity of elements, and (2) cause any determined first stage awards and any determined second stage awards to be provided; and (iv) if the determined second stage outcome is less than the threshold second stage outcome:

(A) determine any second stage awards based on the total quantity of elements, and (B) cause any determined first stage awards and any determined second stage awards to be provided.

3. The method of claim 2, which is provided through a data network.

4. The method of claim 3, wherein the data network is an internet.

5. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) receive a wager from a player for a play of a primary game;

(b) upon an occurrence of a first stage triggering event, initiate a first stage of a bonus game;

(c) for the first stage:

(i) determine one of a plurality of different potential first stage outcomes;

(ii) if the determined first stage outcome satisfies a first stage continuation condition, determine a first stage award and repeat (c)(i) to (c)(iii);

(iii) if the determined first stage outcome satisfies a first stage termination condition, initiate a second stage of the bonus game; and (d) for the second stage:

(i) determine one of a plurality of different potential second stage outcomes;

(ii) if the determined second stage outcome satisfies a second stage continuation condition, modify a total quantity of elements and repeat (d)(i) to (d)(iii); and (iii) if the determined second stage outcome satisfies a second stage termination condition:

(A) determine a second stage awards based on the total quantity of elements, and (B) provide any determined first stage awards and any determined second stage awards.

6. The gaming system of claim 5, wherein the potential first stage outcomes include a first quantity of the potential first stage outcomes and a second different quantity of the potential first stage outcomes, and the first stage continuation condition is satisfied when the at least one processor determines one of the first quantity of the potential first stage outcomes for the first stage.

7. The gaming system of claim 5, wherein the potential first stage outcomes include a first quantity of the potential first stage outcomes and a second different quantity of the potential first stage outcomes, and the first stage termination condition is satisfied when the at least one processor determines one of the second different quantity of the potential first stage outcomes for the first stage.

8. The gaming system of claim 5, wherein the first stage termination condition is satisfied when the at least one processor determines a designated quantity of first stage outcomes for the first stage.

9. The gaming system of claim 5, wherein the potential second stage outcomes include a first quantity of the potential second stage outcomes and a second different quantity of the potential second stage outcomes, and the second stage continuation condition is satisfied when the at least one processor determines one of the first quantity of the potential second stage outcomes for the second stage.

10. The gaming system of claim 5, wherein the plurality of instructions, when executed by the at least one processor, cause the at least one processor to repeat (c)(i) to (c)(iii) when an alternative second stage continuation condition occurs.

11. The gaming system of claim 5, wherein the potential second stage outcomes include a first quantity of the potential second stage outcomes and a second different quantity of the potential second stage outcomes, and the second stage termination condition is satisfied when the at least one processor determines one of the second different quantity of the potential second stage outcomes for the second stage.

12. The gaming system of claim 5, wherein the plurality of instructions, when executed by the at least one processor, cause the at least one processor to modify the total quantity of elements by increasing the total quantity of elements by a designated quantity of elements.

13. The gaming system of claim 12, wherein the second stage termination condition is satisfied when the total quantity of elements reaches a maximum quantity of elements.

14. A method of operating a gaming system, said method comprising:

(a) causing at least one processor to execute a plurality of instructions stored in at least one memory device to operate with at least one input device to receive a wager from a player for a play of a primary game;

(b) upon an occurrence of a first stage triggering event, causing the at least one processor to execute the plurality of instructions to initiate a first stage of a bonus game;

(c) for the first stage, causing the at least one processor to execute the plurality of instructions to:

(i) determine one of a plurality of different potential first stage outcomes;

(ii) if the determined first stage outcome satisfies a first stage continuation condition, determine a first stage award and repeat (c)(i) to (c)(iii);

(iii) if the determined first stage outcome satisfies a first stage termination condition, initiate a second stage of the bonus game; and (d) for the second stage, causing the at least one processor to execute the plurality of instructions to:

(i) determine one of a plurality of different potential second stage outcomes;

(ii) if the determined second stage outcome satisfies a second stage continuation condition, modify a total quantity of elements and repeat (d)(i) to (d)(iii); and (iii) if the determined second stage outcome satisfies a second stage termination condition:

(A) determine a second stage awards based on the total quantity of elements, and (B) cause any determined first stage awards and any determined second stage awards to be provided.

15. The method of claim 14, wherein the potential first stage outcomes include a first quantity of the potential first stage outcomes and a second different quantity of the potential first stage outcomes, and the first stage continuation condition is satisfied when the at least one processor determines one of the first quantity of the potential first stage outcomes for the first stage.

16. The method of claim 14, wherein the potential first stage outcomes include a first quantity of the potential first stage outcomes and a second different quantity of the potential first stage outcomes, and the first stage termination condition is satisfied when the at least one processor determines one of the second different quantity of the potential first stage outcomes for the first stage.

17. The method of claim 14, wherein the first stage termination condition is satisfied when the at least one processor determines a designated quantity of first stage outcomes for the first stage.

18. The method of claim 14, wherein the potential second stage outcomes include a first quantity of the potential second stage outcomes and a second different quantity of the potential second stage outcomes, and the second stage continuation condition is satisfied when the at least one processor determines one of the first quantity of the potential second stage outcomes for the second stage.

19. The method of claim 14, which includes repeating (c)(i) to (c)(iii) when an alternative second stage continuation condition occurs.

20. The method of claim 14, wherein the potential second stage outcomes include a first quantity of the potential second stage outcomes and a second different quantity of the potential second stage outcomes, and the second stage termination condition is satisfied when the at least one processor determines one of the second different quantity of the potential second stage outcomes for the second stage.

21. The method of claim 14, which includes causing the at least one processor to execute the plurality of instructions to modify the total quantity of elements by increasing the total quantity of elements by a designated quantity of elements.

22. The method of claim 21, wherein the second stage termination condition is satisfied when the total quantity of elements reaches a maximum quantity of elements.

23. The method of claim 14, which is provided through a data network.

24. The method of claim 16, wherein the data network is an Internet.

* * * * *